United States Patent [19]

Fuji et al.

[11] Patent Number: 5,546,364
[45] Date of Patent: Aug. 13, 1996

[54] MAGNETO-OPTICAL MEMORY APPARATUS UTILIZING EDGES OR RECORDING MARK TO MANAGE DATA

[75] Inventors: Hiroshi Fuji, Nara-ken; Toshihisa Deguchi, Nara; Kunio Kojima, Nara; Takeshi Yamaguchi, Nara; Shigeo Terashima, Tenri; Akira Takahashi, Nara; Kenji Ohta, Nara-ken, all of Japan

[73] Assignee: Sharp Kabushiki Kaisha, Osaka, Japan

[21] Appl. No.: 311,452

[22] Filed: Sep. 26, 1994

Related U.S. Application Data

[63] Continuation of Ser. No. 924,587, Aug. 6, 1992, abandoned, which is a continuation of Ser. No. 381,772, Jul. 18, 1989, abandoned.

[30] Foreign Application Priority Data

| Jul. 20, 1988 | [JP] | Japan | 63-180708 |
| Jul. 20, 1988 | [JP] | Japan | 63-180709 |
| Aug. 8, 1988 | [JP] | Japan | 63-198523 |
| Aug. 8, 1988 | [JP] | Japan | 63-198524 |
| Aug. 10, 1988 | [JP] | Japan | 63-200847 |
| Aug. 10, 1988 | [JP] | Japan | 63-200848 |

[51] Int. Cl.$^6$ ............. G11B 13/04; G11B 11/12; G11B 7/12
[52] U.S. Cl. ............................................. 369/13
[58] Field of Search .................... 369/13, 14; 360/59, 360/114, 66

[56] References Cited

U.S. PATENT DOCUMENTS

| 4,451,863 | 5/1984 | Yanagida et al. | 360/114 |
| 4,475,183 | 10/1984 | Marchant et al. | |
| 4,561,032 | 12/1985 | Matsumoto et al. | 360/114 |
| 4,807,210 | 2/1989 | Kaku et al. | 369/13 |
| 4,939,710 | 7/1990 | Fuji et al. | 369/13 |
| 5,105,399 | 4/1992 | Shimonou | 369/13 |

FOREIGN PATENT DOCUMENTS

0220023  10/1986  European Pat. Off.

(List continued on next page.)

OTHER PUBLICATIONS

Code Design for Optical Storage—a Comparison to Magnetic Storage by Paul H. Siegel.

High–Density Magneto–Optic Disk Using Highly Controlled Pit–Edge Recording by Sukeda et al.

Daniel Rugar, "Magneto–Optic Direct Overwrite Using a Resonant Bias Coil", IEEE Trans. on Mag. vol. 24, No. 1, Jan. 1988, pp. 666–669.

*Primary Examiner*—Hoa T. Nguyen

[57] ABSTRACT

A magneto-optical memory apparatus for enhancing the recording density of a magneto-optical recording medium, thereby to increase its recording capacity. The magneto-optical recording medium having recording marks, each having two ends in which information is recorded. The apparatus also includes an optical head arranged such that at the time of recording onto the magneto-optical recording medium, the recording marks are recorded such that the ends of each recording mark correspond to a second code of digital information composed of two different types of codes; at the time of reproduction, a light beam having a condensing spot is projected to the magneto-optical recording medium and, when a reproduction light containing reproduction information is entered to the optical head from the magneto-optical recording medium, a reproduction signal is supplied; and when the light beam is projected to a recording mark, an information pulse corresponding to the second code is generated in the reproduction signal, only when the reproduction light from the recording mark interferes with the reproduction light from the non-marking part; and a signal detector circuit for detecting the information pulse in the reproduction signal obtained from the optical head and for converting the reproduction signal into a digital reproduction signal.

22 Claims, 13 Drawing Sheets

FOREIGN PATENT DOCUMENTS

| | | |
|---|---|---|
| 0229035 | 1/1987 | European Pat. Off. . |
| 0279183 | 8/1988 | European Pat. Off. . |
| 0295572 | 12/1988 | European Pat. Off. . |
| 61-105745 | 10/1984 | Japan . |
| 61-115253 | 11/1984 | Japan . |
| 62-84453 | 10/1985 | Japan . |
| 61-153858 | 7/1986 | Japan . |
| 62-188047 | 8/1987 | Japan . |

FIG. 8
DIGITAL DATA           (a)  0 1 0 0 1 1 1 0 0 0 0 1 0 0 1 1 1 1 0 0
RECORDING MARK         (b)  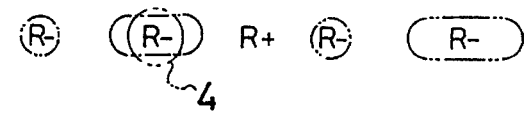
REPRODUCTION SIGNAL    (c)  
FIG. 9
DIGITAL DATA              (h)  0 0 1 0 0 1 0 0 1 0 0 1 0 0 1 0 0 1 0 0
RECORDING MARK            (i)  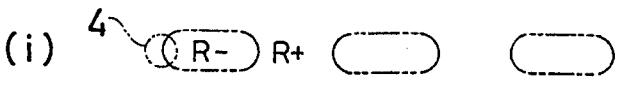
REPRODUCTION SIGNAL       (j)  
DIGITAL REPRODUCTION
SIGNAL                    (k)  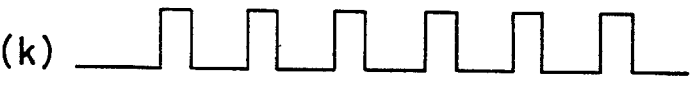
DIGITAL REPRODUCTION
SIGNAL                    (ℓ)  
DIGITAL DATA              (m)  0 0 1 0 0 1 0 0 1 0 0 1 0 0 1 0 0 1 0 0

FIG.10

(h) DIGITAL DATA  0 0 1 0 0 1 0 0 1 0 0 1 0 0 ..... 0 1 1 0 1 1 0

(i) RECORDING MARK (j) REPRODUCTION SIGNAL (k) DIGITAL REPRODUCTION SIGNAL (ℓ) DIGITAL REPRODUCTION SIGNAL (m) DIGITAL DATA  0 0 1 0 0 1 0 0 1 0 0 1 0 0 ..... 0 1 1 0 1 1 0

FIG. 15 (a) PRIOR ART (a) DIGITAL DATA     0 0 1 0 0 1 0 0 1 0 0 1 0 0 1 0 0

(b) RECORDING MARK     R+ ⓡ ○ ○ ○ ○ ○ ○

(c) REPRODUCTION SIGNAL (d) DIGITAL REPRODUCTION SIGNAL (e) DIGITAL REPRODUCTION SIGNAL (f) DIGITAL DATA     0 0 1 0 0 1 0 0 1 0 0 1 0 0 1 0 0

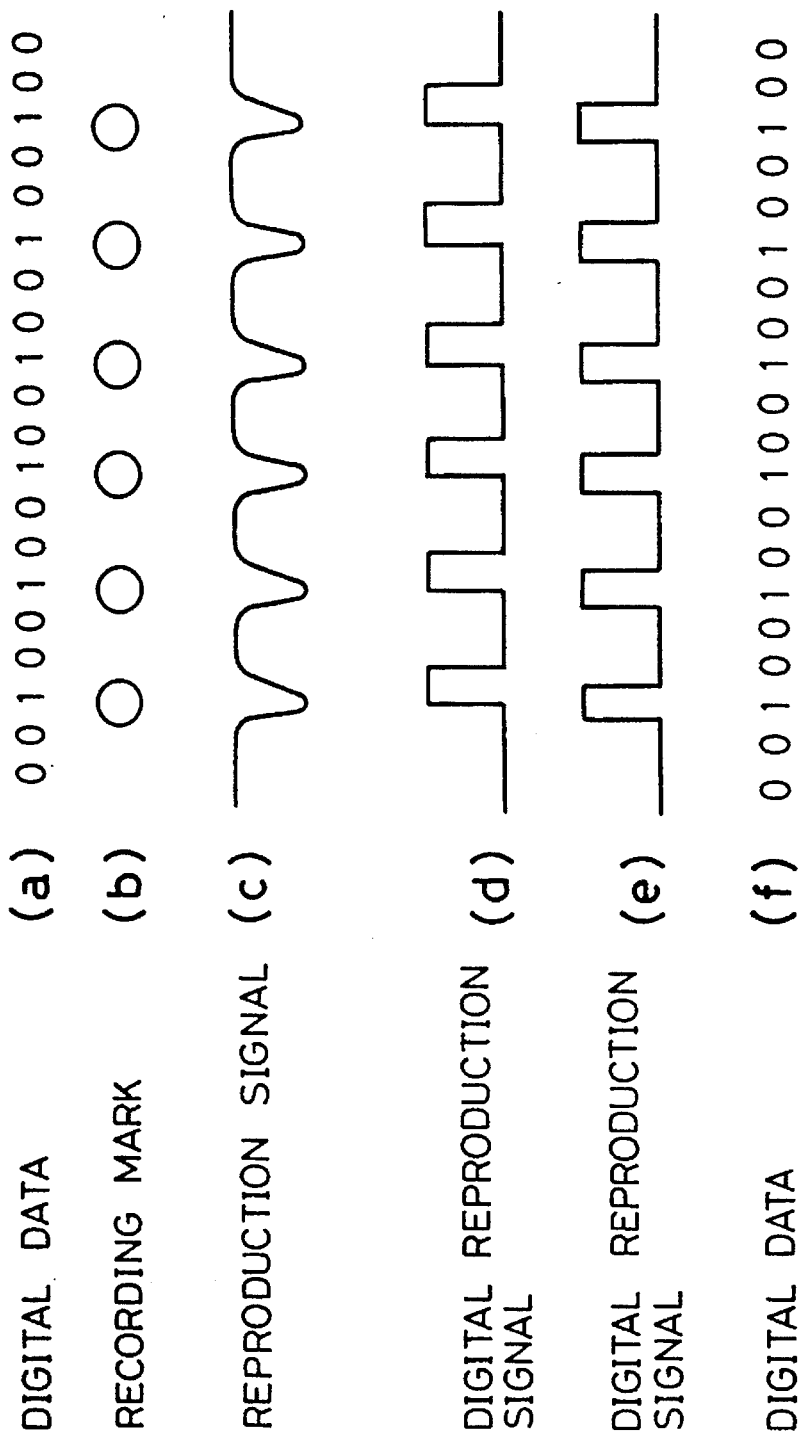
FIG. 15 (b) PRIOR ART

MAGNETO-OPTICAL MEMORY APPARATUS UTILIZING EDGES OR RECORDING MARK TO MANAGE DATA

This application is a continuation of application Ser. No. 07/924,587 filed on Aug. 6, 1992, which is a continuation of Ser. No. 07/381,772 filed on Jul. 18, 1989 now abandoned.

FIELD OF THE INVENTION

The present invention relates onto a magneto-optical memory apparatus in which a light beam is projected to a magneto-optical recording medium for recording information therein, erasing and reproducing the information recorded therein. The present invention also relates to an optical memory apparatus having an optical information recording medium for recording information, in which a light beam is projected to this optical information recording medium and the information is reproduced by the light reflected therefrom.

BACKGROUND OF THE INVENTION

A magneto-optical memory apparatus of the type above-mentioned is arranged such that the optical head projects a laser light condensed to a spot having a diameter of about 1 μm, onto a magneto-optical recording medium capable of recording and erasing information, causing the optical head to record information on the recording medium, as well as to read and erase the information recorded therein, and that the signal detector circuit produces a digital reproduction signal based on a reproduction signal supplied from the optical head. The signal detector circuit has a peak position detector circuit for detecting the peak positions of information pulses of the reproduction signal, or an amplitude detector circuit for detecting the width and interval of the information pulses. By either one of these circuits, a digital reproduction signal may be obtained from the reproduction signal.

As shown in FIG. 13, a conventional magneto-optical memory apparatus includes a magneto-optical disk 101 as the magneto-optical recording medium, and an optical head 102 for recording information in the magneto-optical disk 101, reading the recorded information and erasing the information.

The optical head 102 includes a semiconductor laser 111, a beam splitter (half-mirror) 112, an objective lens 113, a half-wave plate 116, an analyser 117, a condensing lens 114 and a photo detector 115. A light beam emitted from the semiconductor laser 111 passing through the beam splitter (half-mirror) 112 is condensed by the objective lens 113 and projected onto the magneto-optical disk 101. The reproduction light reflected from the magneto-optical disk 101 passes through the objective lens 113 and is vertically turned, at a portion thereof, by the beam splitter (half-mirror) 112. This light is inclined at a predetermined angle in the polarization direction by the half-wave plate 116. Then, the light passes through the analyser 117 and is condensed by the condensing lens 114. Thereafter, the light is incident on the photo detector 115. In the photo detector 115, the reproduction light is converted into an electric signal, which is then sent to a signal detector circuit 23. In the signal detection circuit 23, the data are reproduced.

The magneto-optical disk 101 as the magneto-optical recording medium, includes a magnetic thin film having a magnetization facilitating axis in a direction at a right angle to the surface of the thin film. Data may be recorded in the magneto-optical disk 101 as outlined below.

When the optical head 102 projects a laser light to the magnetic thin film of the magneto-optical disk 101, the portion of the thin film irradiated by the laser light is locally increased in temperature to lower the coercive force thereof. When a magnetic field is externally applied to this portion, the magnetization direction thereof may be inverted in a desired direction. Data are recorded by such inversion of the magnetization direction.

On the other hand, data reproduction may be carried out as outlined below.

When a laser light of linear polarization weaker than that used at the time of recording, is projected onto the magneto-optical recording medium, the polarization plane of the reproduction light which is a reflected light or a transmission light from the magneto-optical recording medium, is rotated by a desired angle according to the magnetization direction of the magneto-optical recording medium. The rotation of the polarization plane results from the Faraday effect for the transmission light and from the Kerr effect for the reflected light. For example, it is now supposed that the vector of the reflected light in a magnetization direction of the magneto-optical recording medium is expressed by R+, while the vector of the reflected light in the inverted magnetization direction with respect to the first-mentioned magnetization direction is expressed by R−. In this case, the rotation angles of the polarization planes corresponding to these reflected lights R+ and R− with respect to the incident polarization plane, are respectively expressed by $+\theta_K$ and $-\theta_K'$, as shown in FIG. 14. Provision is made such that the reproduction signal as an electric signal is obtained by detecting the detection polarization plane components Rα+ and Rα− of the reflected lights R+ and R− on the detection polarization plane set at 45° with respect to the incident polarization plane. At this time, Rα− and Rα+ are in low and high levels of a binary code, respectively.

The following description will discuss in more detail the operation of the magneto-optical memory apparatus having the principle above-mentioned, with reference to FIG. 15(a).

Corresponding to digital data (a) shown in FIG. 15(a), recording marks (b) are recorded in the magneto-optical disk 101 by inversion of magnetization. It is now supposed that the vectors of the reflected lights from the recording marks are expressed by R−, while the vectors of the reflected lights from other non-marking parts than the recording marks are expressed by R+. Then, a reproduction signal (c) is obtained from the optical head 102 which has received the reflected lights from the magneto-optical disk 101. In the reproduction signal (c), negative-direction pulses are generated by the reflected lights R− from the recording marks, and high-level pulses are generated by the reflected lights R+ from the non-marking parts.

When the signal detector circuit 23 has a peak position detector circuit (not shown), the signal detector circuit 23 to which the reproduction signal (c) above-mentioned has been entered, supplies a digital reproduction signal (d) of which rise portions are identical with the negative-direction peak positions of the reproduction signal (c). On the other hand, when the signal detector circuit 23 includes an amplitude detector circuit (not shown), the signal detector circuit 23 supplies a digital reproduction signal (e) which is in a high level for a predetermined width to the negative-direction peak positions of the reproduction signal (c). Based on the digital reproduction signal (d) or (e), digital data (f) may be obtained as reproduction information.

A conventional optical memory apparatus comprises: an optical information recording medium in which information is recorded by forming physical concavo-convex portions therein; an optical head for reading the information recorded in the optical information recording medium; and a signal detector circuit for generating a digital reproduction signal from the information read by the optical head. The description of the optical head and the signal detector circuit in the optical memory apparatus is here omitted since they have the same functions and the like as those of the optical head and the signal detector circuit in the magneto-optical memory apparatus above-mentioned.

The following description will discuss the operation of the optical memory apparatus with reference to FIG. 15(b).

As shown in FIG. 15(b), recorded in the optical information recording medium are recording marks (b), as recording information, corresponding to the digital data (a). In reading the recording marks by the optical head, the amounts of the reflected lights are increased or decreased by the diffraction thereof due to the concavo-convex portions above-mentioned. Thus, a reproduction signal (c) is generated. When the signal detector circuit has a peak position detector circuit, the signal detector circuit to which the reproduction signal (c) has been entered, generates a digital reproduction signal (d) of which rise portions are identical with the negative-direction peak positions of the reproduction signal (c). On the other hand, when the signal detector circuit includes an amplitude detector circuit, the signal detector circuit supplies a digital reproduction signal (e) which is in a high level for a predetermined width to the negative-direction peak positions of the reproduction signal (c). Based on the digital reproduction signal (d) or (e), digital data (f) may be obtained as reproduction information.

The magneto-optical memory apparatus mentioned earlier generally employs a magneto-optical recording medium in which formed are (i) physical concavo-convex portions presenting track address information and the like and (ii) recording areas for recording information by inverting the magnetization direction of the magneto-optical recording medium.

The conventional above-mentioned arrangement presents the problem that it is difficult to enhance the recording density in the magneto-optical recording medium to increase the recording capacity.

More specifically, to enhance the recording density of the magneto-optical recording medium in the arrangement above-mentioned, the recording marks need to be further reduced in size. However, as the recording marks are reduced in size, it becomes difficult to record such recording marks into the magneto-optical recording medium. For example, when a laser light is condensed on the magneto-optical recording medium to record the recording marks, it is more difficult to properly form smaller recording marks in view of the degree of diaphragming the laser beam, the characteristics of the magneto-optical recording medium, the ambient temperature and the like. Accordingly, it is difficult to enhance the recording density by forming small-size recording marks. Thus, the conventional arrangement is not suitable to enhance the recording density.

SUMMARY OF THE INVENTION

It is an object of the present invention to provide a magneto-optical memory apparatus or an optical memory apparatus in which each recording mark on the recording medium contains several information to enhance the recording density in the magneto-optical recording medium or the optical information recording medium, thus increasing the recording capacity.

It is another object of the present invention to provide a magneto-optical memory medium in which the recording marks are made larger than conventional marks to facilitate the formation of the recording marks.

It is a further object of the present invention to provide a magneto-optical memory apparatus in which the number of component elements of the optical system is reduced to simplify the optical system's arrangement.

It is still another object of the present invention to provide an optical memory apparatus in which the recording marks are made larger than conventional marks to facilitate the formation of the recording marks, thereby facilitating the transfer of the recording marks made by plastic forming or the like.

It is a still further object of the present invention to provide a magneto-optical memory apparatus having a magneto-optical recording medium which previously contains physical concavo-convex portions presenting track address information and the like, recording marks being formed larger than conventional marks in the magneto-optical recording medium to facilitate the formation of the recording marks.

To achieve the objects above-mentioned, the present invention provides a magneto-optical memory apparatus with a reduced number of parts in a particular relationship of the recording marks on the medium.

To also achieve the objects above mentioned, the present invention provides a magneto optical memory apparatus comprising:

A magneto-optical recording medium whereon information is recorded by forming a plurality of recording marks, said respective recording marks each having two ends in a track direction, said information in the form of recording marks on said magneto-optical recording medium having been recorded by inversion of a magnetization direction of a portion of said magneto-optical recording medium such that each one of said ends of the recording marks coincides with one of two different binary logic conditions;

reproducing means for reproducing the recorded information by projecting a light beam onto said magneto-optical recording medium, for releasing a reproduction signal responsive to a reflected beam from said recording medium, and for generating information pulses in the reproduction signal each time a part of said reflected light beam from a recording mark interferes with a part of said reflected light beam from a non-recorded area, said information pulses corresponding to said binary logic condition associated with said ends of the recording marks; and signal detection means for converting said reproduction signal into a digital reproduction signal according to said information pulses;

said reproducing means further including analyzer means having a detection polarization plate which plane of polarization is perpendicular to a polarization direction of said light beam.

To also achieve the objects mentioned above the present invention provides a magneto optical apparatus comprising:

A magneto-optical recording medium whereon information is recorded by forming a plurality of first recording marks and second recording marks, each of said respective first and second recording marks having two ends in a track direction, said information being recorded in the form of first and second recording marks on said magneto-optical recording medium such that each one of said ends of the recording marks coincides with one of two different binary logic conditions 1 and 0; and reproducing means for reproducing the recorded information by projecting a light beam onto said magneto-optical recording medium, said light beam having a diameter smaller than the width of each said first recording marks in a direction orthogonal to the track direction and greater than the width of each said second recording mark in a direction orthogonal to the track direction, for releasing a reproduction signal responsive to a part of said reflected light beam from said recording medium, and for generating information pulses in the reproduction signal when a part of a reflected light beam from said first or second recording mark interferes with a reflected beam from a non-recorded area, said information pulses corresponding to said binary logic condition associated with said ends of the recording marks;

signal detection means for converting said reproduction signal into a digital reproduction signal according to said information pulses;

wherein a width of each second recording mark in a minor radial direction is smaller than the width of said first recording mark in a minor radial direction; and said second recording mark is arranged so that a reproduction signal smaller than a reference level is released due to optical interference of a part of said reflected light beam from said second recording mark with a part of said reflected beam from the non-recorded area.

To reduce the number of component elements of the optical system, the optical system unit may include a polarization beam splitter and may be arranged such that the detection polarization plane is at a right angle to the incident polarization plane.

The optical head projects that, at the time of reproduction, a condensing spot having a diameter greater than the width of a recording mark of the magneto-optical recording medium, to the magneto-optical recording medium, and the reflected light as a reproduction light is then obtained.

BRIEF DESCRIPTION OF THE DRAWINGS

FIG. 1 to FIG. 12 show an embodiment of the present invention;

FIG. 1 is a schematic block diagram of main portions of magneto-optical memory apparatus in accordance with the present invention;

FIG. 2 is a view illustrating the arrangement of the magneto-optical memory apparatus in FIG. 1;

FIG. 3 is a view illustrating a reproducing operation of an optical head in which the incident polarization plane of the polarization beam splitter is disposed at a right angle to the detection polarization plane thereof;

FIG. 4(a) is a view illustrating the relationship between recording marks and the waveforms of signals at respective parts of the magneto-optical memory apparatus;

FIG. 4(b) is a view illustrating the relationship between recording marks and the waveforms of signals at respective parts of the optical memory apparatus;

FIG. 5(a) is a view illustrating the relationship between a recording mark and a light condensing spot in a calculator simulation as to reproduction signals of the magneto-optical memory apparatus shown in FIG. 6;

FIG. 5(b) is a view illustrating the relationship between a recording mark and a light condensing spot in a calculator simulation as to reproduction signals of an optical memory apparatus shown in FIG. 6;

FIG. 6 shows the results of a calculator simulation in the form of a graph which illustrates the relationship between the position of the light condensing spot on a recording mark and the intensity of the reproduction light incident on a photo detector;

FIG. 7 shows the results of a calculator simulation in the form of a graph which illustrates the relationship between (i) the position of the light condensing spot on a recording mark C having a depth or a height D of 0.065 μm, and (ii) the intensity of the reproduction light incident on a photo detector;

FIG. 8 to FIG. 9 views illustrating the relationship between different recording marks and the waveforms of signals at the respective parts of the apparatus when such different recording marks are recorded in the magneto-optical recording medium;

FIG. 10 is a view illustrating the relationship between recording marks and the waveforms of signals at respective parts of an optical information recording medium;

FIG. 11 is a block diagram illustrating the arrangement of main portions of the magneto-optical memory apparatus using a two-division photo detector;

FIG. 12 is a view illustrating the relationship between recording marks and the waveforms of signals at respective parts when the magneto-optical memory apparatus having the arrangement in FIG. 11 is used;

FIG. 13 to FIG. 15 show a conventional magneto-optical memory apparatus;

FIG. 13 is a view illustrating main protions of a conventional magneto-optical memory apparatus;

FIG. 14 is a view illustrating the reproducing operation of the optical head in which the incident polarization plane of the analyser is disposed at 45° with respect to the detection polarization plane thereof;

FIG. 15(a) is a view illustrating the relationship between recording marks and the waveforms of signals at respective parts of the magneto-optical memory apparatus; and FIG. 15(b) is a view illustrating the relationship between recording marks and the waveforms of signals at respective parts of the optical memory apparatus.

DESCRIPTION OF THE EMBODIMENTS

The following description will discuss an embodiment of the present invention with reference to FIG. 1 to FIG. 12.

Figure 1:
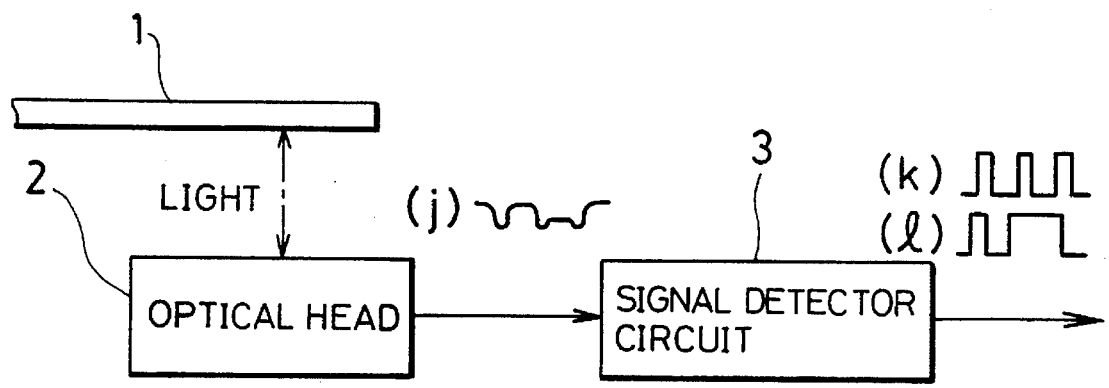

As shown in FIG. 1, the magneto-optical memory apparatus in accordance with the present invention comprises: a magneto-optical disk 1 as a magneto-optical recording medium; an optical head 2 for recording information in the magneto-optical disk 1, reading and erasing the information recorded therein; and a signal detector circuit 3 for converting a reproduction signal obtained from the optical head 2 into a digital reproduction signal.

The magneto-optical disk 1 has a magnetic thin film having a magnetization facilitating axis in a direction at a right angle to the surface of the thin film. By inverting the magnetization direction, first and second recording marks as information may be recorded, erased and so on. The magneto-optical disk 1 is movable with respect to the optical head 2.

Figure 2:
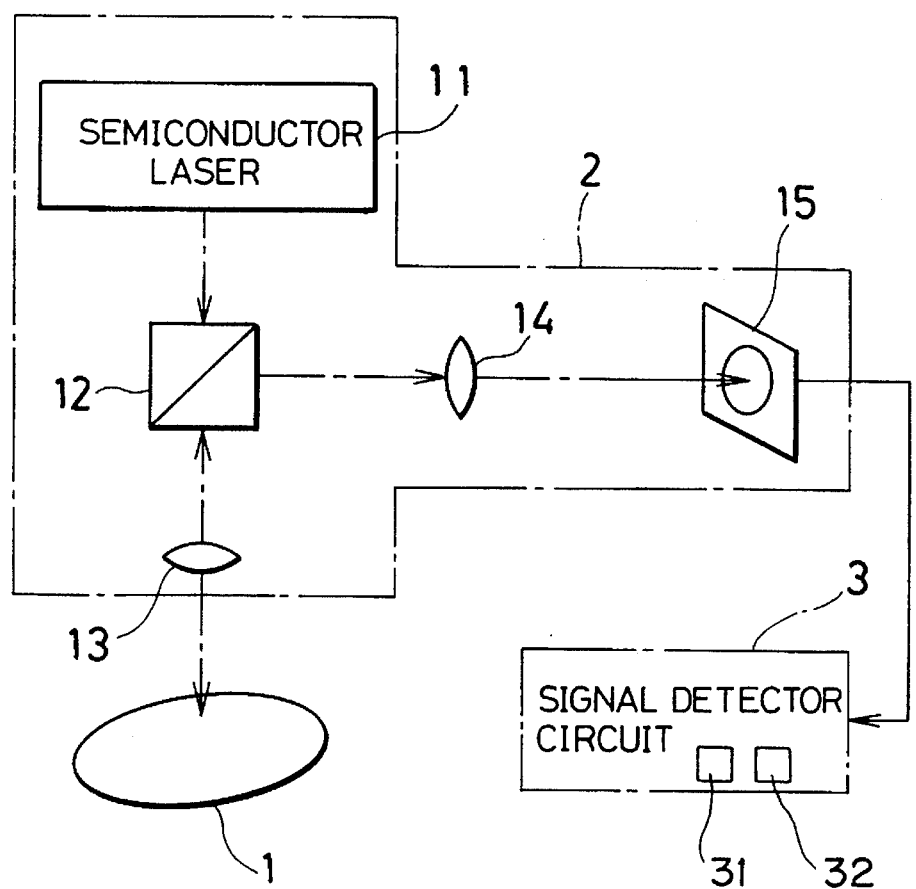

In the optical head 2, a laser light emitted from a semiconductor laser 11 passes through a polarization beam splitter 12 and is condensed by an objective lens 13, as shown in FIG. 2. The laser light is then incident on the magneto-optical disk 1. The reflected light passes again through the objective lens 13 and is partially dispersed in optical pass by the polarization beam splitter 12. The polarization beam splitter 12 is arranged such that the detection polarization plane thereof is at a right angle to the incident polarization plane. The polarization beam splitter 12 also serves as an analyser. The reflected light is condensed by a condensing lens 14 and converted into an electric signal by a photo detector 15. This signal is then sent to the signal detector circuit 3.

The optical head 2 is arranged such that, when a laser light as a light beam is projected onto the magneto-optical disk 1, recording marks A as first recording marks and recording marks B as second recording marks shown at (i) in FIG. 4(a) are recorded for digital data (h) in FIG. 4(a) as digital information. In each recording mark A, each end or edge thereof in the relative moving direction with respect to the optical head 2, corresponds to one "1" sandwiched in between two "0". It is here noted that "0" represents a first code and "1" represents a second code. In each recording mark B, each edge and the intermediate portion between both edges thereof correspond to "1". Each recording mark B corresponds, in its entirety, to "1111". Each recording mark B has a width narrower than that of each recording mark A. The part of each recording mark A between both edges thereof, and other no-marking parts than the recording marks A and B, correspond to "0". Each recording mark A is made in the form of an ellipse of which its length and width are greater than the diameter of a condensing spot 4 of a laser light used at the time of reproduction. Each recording mark B has a length longer than the diameter of the condensing spot 4. This facilitates the generation of information pulses, to be discussed later.

At the time of reproduction, the optical head 2 is adapted to supply a reproduction signal when a laser light having the condensing spot 4 with a diameter smaller than the width of each recording mark A and greater than the width of each recording mark B, is projected onto the magneto-optical disk 1 and the reflected light is received into the optical head 2. Only when the optical head 2 receives the reflected light generated at the time an end of a recording mark A or B is irradiated by the laser light, the optical head 2 generates, in the reproduction signal, an information pulse corresponding to "1" as the second code due to interference of the reflected light from the recording mark A or B with the reflected light from the non-marking part. When the laser light is projected to the intermediate portion between both ends of a recording mark B, the optical head 2 is adapted to supply a reproduction signal whose level is lower than a reference value, due to interference of the reflected light from the recording mark B with the reflected light from the non-marking part.

Figure 3:
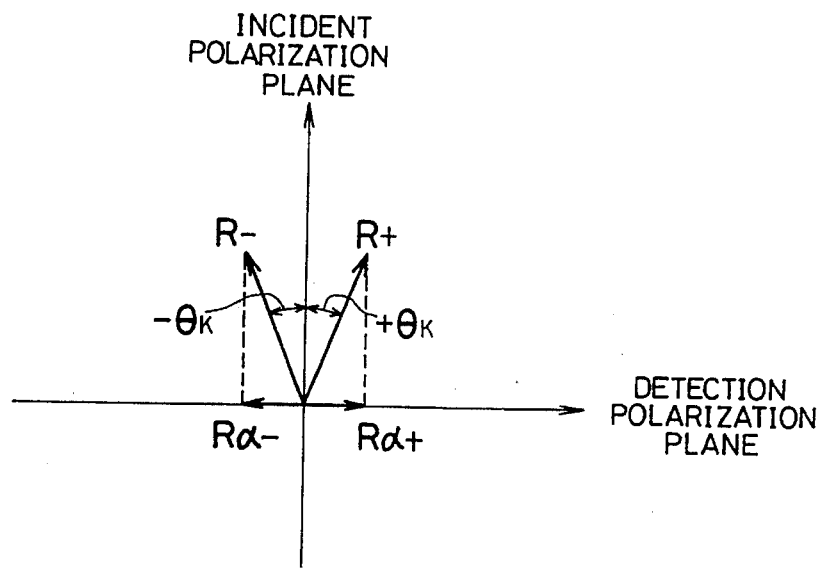
Figure 4:
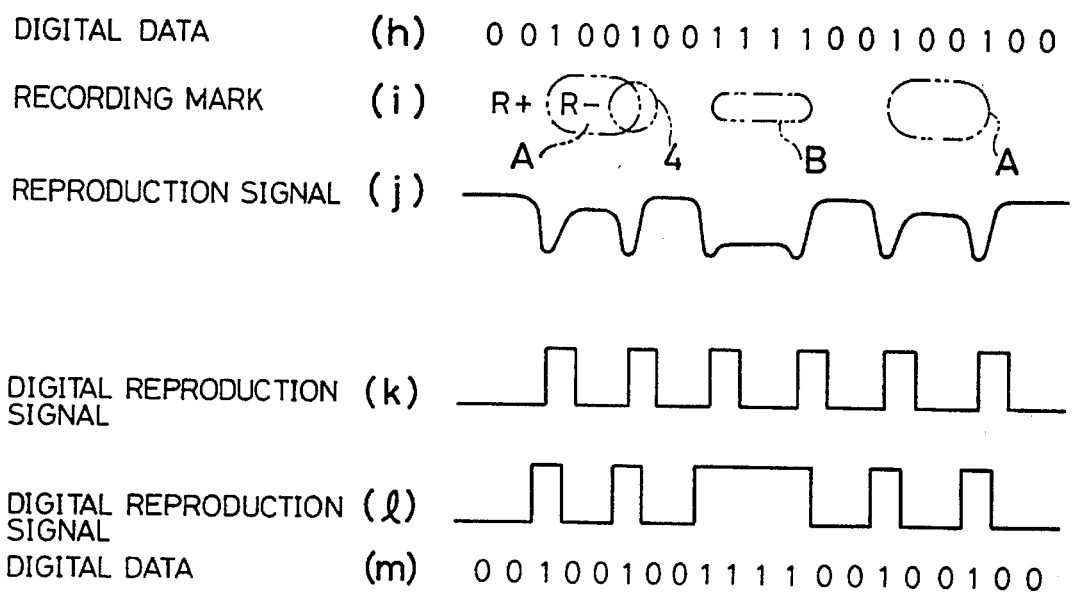
Figure 4:
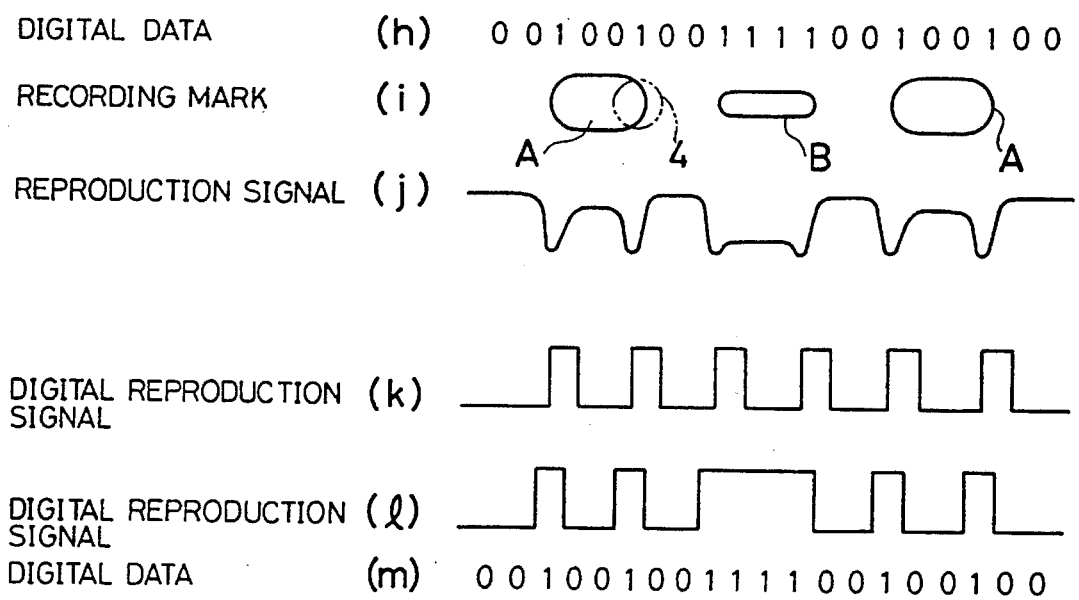

According to this embodiment, the optical head 2 includes the polarization beam splitter 12 (serving also as an analyser) in which the incident polarization plane is disposed at a right angle to the detection polarization plane thereof, and the photo detector 15 for converting the output of the polarization beam splitter 12 into an electric signal, as shown in FIG. 3. When a light beam is projected to an edge of a recording mark A or B, the polarization planes of the reflected lights from the recording mark A or B and the non-marking part are rotated in opposite directions on the laser light incident polarization plane, as shown in FIG. 3. The detection polarization plane components of both reflected lights are shifted by 180° in phase. This produces, in a reproduction signal supplied from the photo detector 15, an information pulse or a portion having a level lower than a reference value.

The signal detector circuit 3 detects, as 1 or the second code, (i) information pulses contained in the reproduction signal supplied from the optical head 2, and (ii) parts between information pulses of which level is not greater than the reference value. The signal detector circuit 3 then converts the reproduction signal into the digital reproduction signal. More specifically, the signal detector circuit 3 has a peak position detector circuit 31 of FIG. 2 for detecting the peak positions of information pulses in the reproduction signal, and an amplitude detector circuit 32 of FIG. 2 for detecting the width and interval of information pulses of which level is not greater than the reference value. By both circuits abovementioned, the digital reproduction signal may be obtained from the reproduction signal.

When recording information using the magneto-optical memory apparatus having the arrangement abovementioned, the optical head 2 projects a light beam to the magneto-optical disk 1, and by inverting the magnetization of the part irradiated by this light beam, the recording marks A, B shown by (i) in FIG. 4(a) corresponding to the digital data (h) in FIG. 4(a) are recorded in the magneto-optical disk 1. The recording marks A are recorded such that each edge thereof corresponds to "1" sandwiched in between two "0" in the digital data (h). Each recording mark B is recorded such that each edge and the part between both edges thereof correspond to "1" and the width thereof is smaller than that of each recording mark A.

At the time of reproduction, the optical head 2 projects, to the magneto-optical disk 1, a light beam having a light condensing spot with a diameter smaller than the width of each recording mark A and greater than the width of each recording mark B. The reflected light thereof is received by the optical head 2, which produces a reproduction signal (j).

When the light beam from the optical head 2 is projected to other non-marking part than the recording marks A, B of the magneto-optical disk 1, the Kerr effect causes the polarization plane of the reflected light to be rotated according to the magnetization direction of the non-marking part. It is now supposed that the polarization plane is rotated by $+\theta_K$ with respect to the incident polarization plane as shown in FIG. 3. Then, the vector of the reflected light is R+. Since the detection polarization plane of the polarization beam splitter 12 is disposed at a right angle to the laser light incident polarization plane, the detection polarization plane component R$\alpha$+ of the reflected light R+ is obtained by detection at the polarization beam splitter 12, and the reproduction signal (j) obtained from the photo detector 15 is in a high level.

When the light beam is projected to the part of a recording mark A between both edges thereof, the polarization plane of the reflected light is rotated by $-\theta_K$ and the vector of the reflected light is R−, since the recording mark A is inverted in magnetization with respect to the non-marking part. Then, the detection polarization plane component R$\alpha$− of the reflected light R− is obtained by detection at the polarization beam splitter 12, and the reproduction signal (j) from the photo detector is in a high level. At this time, the reproduction signal (j) is slightly low in level. This is because the reflected light from the non-marking part slightly interferes with the reflected light from the recording mark A.

When the light beam is projected to an edge of a recording mark A as shown in FIG. 4(a), the polarization planes of the reflected lights from the recording mark A and the non-marking part are respectively rotated by $-\theta_K$ and $+\theta_K$. Accordingly, the detection polarization plane components of both reflected lights are shifted by 180° in phase. Accordingly, the output of the photo detector 15 is minimized and a negative-direction information pulse is generated in the reproduction signal (j), at the point where the recording mark A and the non-marking part are equally irradiated by the condensing spot 4 of the light beam.

On the other hand, when an edge of a recording mark B of the magneto-optical disk 1 is irradiated by the light beam projected by the optical head 2, a negative-direction information pulse is generated in the reproduction signal (j), as likewise in the recording mark A above-mentioned. When the part of a recording mark B between both edges thereof is irradiated, the reflected light from the recording mark B interferes with the reflected light from the non-marking part and the reproduction signal (j) is lower in level than the reference value, since the condensing spot of the light beam has a diameter greater than the width of the recording mark B.

Figure 5:
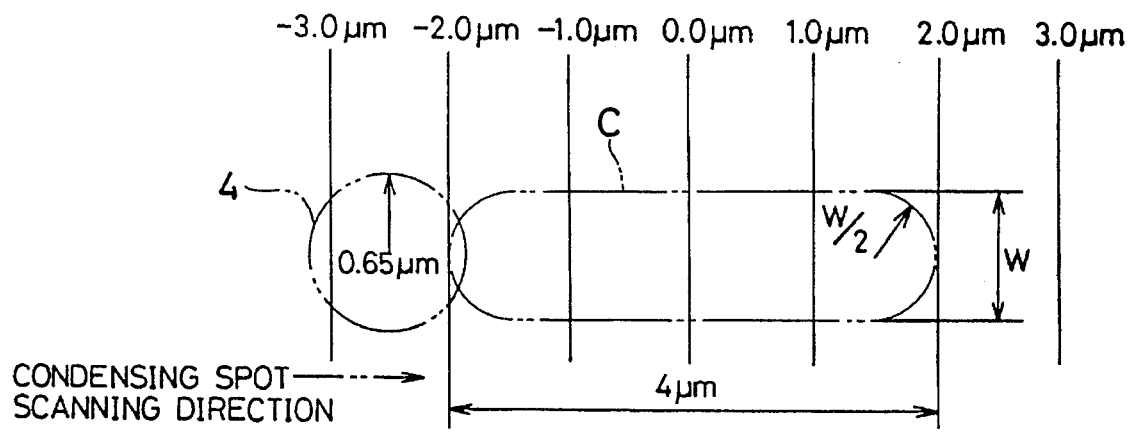
Figure 5:
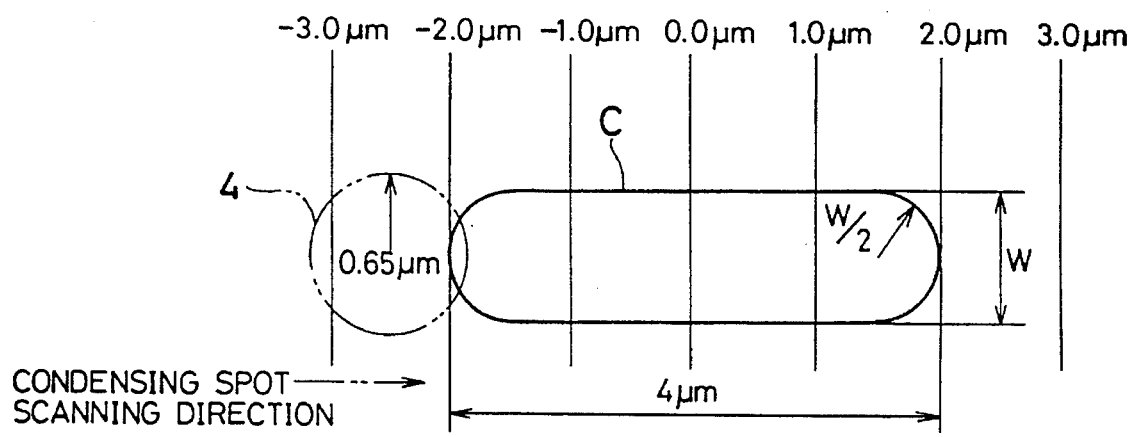
Figure 6:
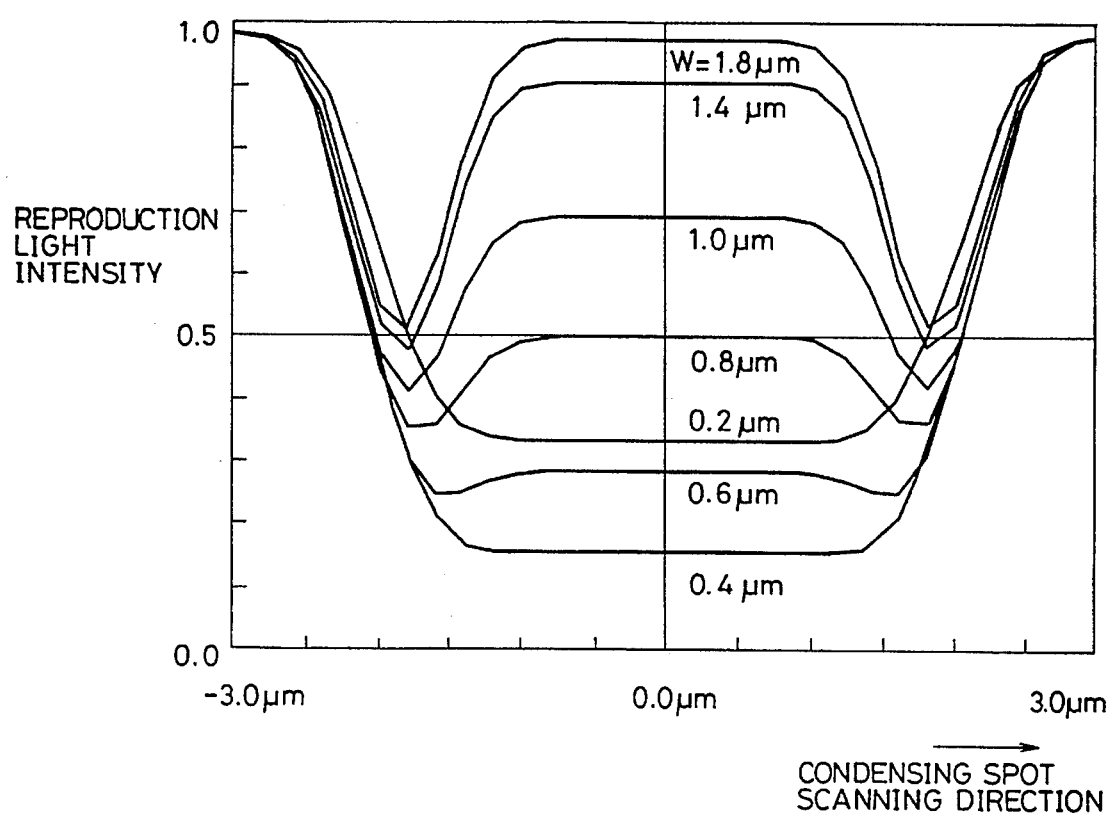

FIGS. 5(a) and 6 show an example of the results of calculator simulations of the reproduction signal.

FIG. 5(a) shows the relationship between a recording mark C and the light condensing spot 4 in a calculator simulation of reproduction signals in FIG. 6. In FIG. 5 (a), the recording mark C is made in the form of an ellipse having a length of 4 μm and a width of W, and has at each edge thereof a semi-circular portion having a radius with a W/2. The light condensing spot 4 is a Gaussian beam of radius of 0.65 μm (This is a radius of a circle of which beam intensity is equal to $1/e^2$). The light condensing spot 4 scans in the direction of the line of apsides of the recording mark C. The distance in center between the recording mark C and the light condensing spot 4 is shown at the upper portion in FIG. 5(a). The substrate of the magneto-optical disk 1 having the recording mark C formed thereon, has a refractive index of 1.5. The pitch between adjacent tracks in the longitudinal direction on the drawing paper is equal to 1.6 μm. The objective lens has an aperture ratio of 0.55, and the laser light forming the condensing spot 4 has a wavelength of 0.78 μm.

FIG. 6 shows the results of a simulation. The axis of abscissa represents the scanning direction of the light condensing spot 4 and shows the distance between the center of the recording mark C and the center of the light condensing spot 4. The axis of ordinate represents the intensity of a reproduction light incident on the photo detector. This intensity is set to 1.0 when the light condensing spot 4 is located perfectly in positions other than the recording mark C, and set to 0.0 when no reproduction light is generated. The photo detector 15 generates a reproduction signal corresponding to such a reproduction light. A simulation was made of the reproduction waveform for seven different widths W (twice the radius of the edge arcuate portion) of the recording mark C, i.e., 0.2 μm, 0.4 μm, 0.6 μm, 0.8 μm, 1.0 μm, 1.4 μm and 1.8 μm. There are obtained remarkable pulses at the edges of the recording mark C for W=1.4 μm and 1.8 μm.

As to the width W of the recording mark C (twice the radius of the edge arcuate portion thereof), remarkable pulses are obtained for W=1.8 μm and 1.4 μm. However, even when W is equal to 1.0 μm and 0.8 μm, pulses are still present at the edges and the center portion of the recording mark C is gradually lowered in level.

The simulations were made under the conditions above-mentioned. It is apparent that the optimum width, depth or height of the recording mark C varies with changes in, for example, the refractive index of a glass substrate, the wavelength λ of the laser light, the aperture ratio of the objective lens and the like.

The following description will discuss how to record data with the width W of the recording mark C altered.

For example, the intensity of an externally applied magnetic field is weakened when the diameter of the light condensing spot 4 maintained constant. This enables data to be recorded with the width of the recording mark C reduced. On the contrary, if the externally applied magnetic field is increased, the width of the recording mark C is increased.

Instead of alteration of the intensity of the magnetic field, the light intensity of the light condensing spot 4 used at the recording time may vary. That is, as the light intensity is lowered, the width of the recording mark C is reduced, and vice versa.

Alternately, the same effect may be achieved by electrically shifting the focus in a focus servo system for condensing the light condensing spot 4 on the magneto-optical disk 1. That is, the addition of offset to the focus enables the light condensing spot 4 to be widened.

The reproduction signal (j) is entered into the signal detector circuit 3. A peak position detector circuit (not shown) in the circuit 3 generates a digital reproduction signal (k) of which rise portions are identical with the negative peaks of the information pulses in the reproduction signal (j). The amplitude detector circuit (not shown) of the circuit 3 generates a digital reproduction signal (l) in a high level for a predetermined width, to (a) the negative peak positions and (b) the parts having a level lower than the reference value, of the information pulses in the reproduction signal (j). The pulses of these digital reproduction signals (k) and (l) correspond to "1" of the digital data (h). Thus, digital data (m) as reproduction information may be obtained from both signals (k) and (l).

The arrangement for obtaining the digital data (m) may be made such that the information pulses generated for the edges of the recording marks A, B are utilized as reproduction clocks and that the reproduction of information is made by detecting the level between edges of a recording mark B.

The description has been made of the embodiment in which reproduction is made by utilizing the fact that the polarization plane of the reflected light from the magneto-optical disk 1 is rotated by the Kerr effect. However, the present invention may be arranged such that reproduction is made by utilizing the fact that the polarization plane of the transmission light of the magneto-optical disk 1 is rotated by the Faraday effect.

Also, the description has been made of the embodiment in which the detection polarization plane of the polarization beam splitter 12 is disposed at a right angle to the laser light incident polarization plane. However, these planes are not necessarily disposed at a right angle to each other, as far as provision is made such that there occurs, at the edges of the recording marks A, B and between the edges of each recording mark B, interference in the reflected lights or transmission lights of the recording marks A, B and the non-marking parts.

The recording marks above-mentioned are so recorded as to correspond to the second code of the digital information composed of two different types of codes (0, 1). Accordingly, the recording marks may be those as shown in FIG. 8(b). More specifically, at the time of the recording operation of the magneto-optical memory apparatus, a laser light is projected from the semiconductor laser 11 of the optical head 2, and this laser light is converted into a linear polaralization light by the polarization beam splitter 12. The linear polarization light is then incident onto the objective lens 13, which condenses the light on the magneto-optical disk 1. The part of the magneto-optical disk 1 irradiated by the laser light is inverted in magnetization and, as shown in FIG. 8, the recording marks (b) are recorded for the digital data (a). Recording is made such that the recording marks correspond to "1" in the digital data (a).

At the time of reproduction, a laser light projected from the semiconductor laser 11 is condensed, by the objective lens 13, into the condensing spot 4 having a diameter greater than the width of each recording mark. The condensing spot 4 is then projected to the magneto-optical disk 1. The reflected light from the magneto-optical disk 1 is incident on the polarization beam splitter 12 through the objective lens 13, and then taken out as a detection polarization plane component corresponding to the magnetization direction of the magneto-optical disk 1. The light thus taken out is condensed onto the photo detector 15 by the condensing lens 14 and then converted into an electric signal, which is then generated as a reproduction signal (c).

When the laser light from the optical head 2 is projected to a non-marking part of the magneto-optical disk 1, the polarization plane of the reflected light is rotated according to the magnetization direction of the non-marking part by the Kerr effect. If the polarization plane is rotated by $+\theta_K$ as shown in FIG. 3, the vector of the reflected light is R+. Since the detection polarization plane of the polarization beam splitter 12 is disposed at a right angle to the laser light incident polarization plane, a detection polarization plane component of the reflected light R+ is obtained by detection at the polarization beam splitter 12. The detection polarization plane component Rα+ is incident on the photo detector 15. At this time, since no light interference occurs, a large amount of the light is incident on the photo detector 15. Accordingly, the reproduction signal (c) supplied from the photo detector 15 is in a high level.

When the magneto-optical disk 1 is moved, causing the laser light condensing spot 4 to be projected to a recording mark, the polarization planes of the reflected lights from the recording mark and the non-marking part are respectively rotated by $-\theta_K$ and $+\theta_K$, since the recording mark is inverted in magnetization with respect to the non-marking part. Thus, the detection polarization plane components of both reflected lights are shifted by 180° in phase. This causes the reflected lights from the recording mark and the non-marking part to interfere with each other. This reduces the amount of the reflected light incident on the photo detector 15. Accordingly, the reproduction signal (c) supplied from the photo detector 15 is in a low level in a range according to the length of the recording mark.

As another example, the recording marks may be formed as shown by (i) in FIG. 9. More specifically, at the time of recording, the optical head 2 projects a laser light to the magneto-optic al disk 1. By inversion in magnetization of the part of the magneto-optical disk 1 irradiated by the laser light, recording marks as shown in FIG. 9(i) may be recorded in the magneto-optical disk 1 for digital data in FIG. 9(h). Such recording is made such that each edge of the recording marks corresponds to "1" sandwiched in between two "0" in the digital data (h).

At the time of reproduction, the optical head 2 projects, to the magneto-optical disk 1, a laser light having the condensing spot 4 with a diameter smaller than the width of each recording mark. The reflected light is received by the optical head 2, which generates a reproduction signal (j).

When the laser light from the optical head 2 is projected to a non-marking part of the magneto-optical disk 1, the vector of the reflected light is R+, provided that the polarization plane of the reflected light is rotated by $+\theta_K$ according to the magnetization direction of the non-marking part by the Kerr effect, as shown in FIG. 3. Since the detection polarization plane of the polarization beam splitter 12 is disposed at a right angle to the laser light incident polarization plane, the detection polarization plane component Rα+ of the reflected light R+ is obtained by detection at the polarization beam splitter 12, and a reproduction signal (j) obtained from the photo detector is in a high level.

When the light beam is projected to the part of a recording mark between both edges thereof, the polarization plane of the reflected light is rotated by $-\theta_K$ and the vector of the reflected light is R−, since the recording mark is inverted in magnetization with respect to the non-marking part. Then, the detection polarization plane component Rα− of the reflected light R− is obtained by detection at the polarization beam splitter 12 and the reproduction signal (j) from the photo detector is in a high level. At this time, the reproduction signal (j) is slightly low in level. This is because the reflected light from the non-marking part slightly interferes with the reflected light from the recording mark.

When the laser light is projected to an edge of a recording mark as shown by (i) in FIG. 9, the polarization planes of the reflected lights from the recording mark and the non-marking part are respectively rotated by $-\theta_K$ and $+\theta_K$. Accordingly, the detection polarization plane components of both reflected lights are shifted by 180° in phase. Accordingly, the output of the photo detector 15 is minimized and a negative information pulse is generated in the reproduction signal (j), at the point where the recording mark and the non-marking part are equally irradiated by the laser light condensing spot 4. Thereafter, digital data (m) are reproduced from digital reproduction signals (k) and (l) through the signal detector circuit 3, similar to that previously described.

Figure 11:
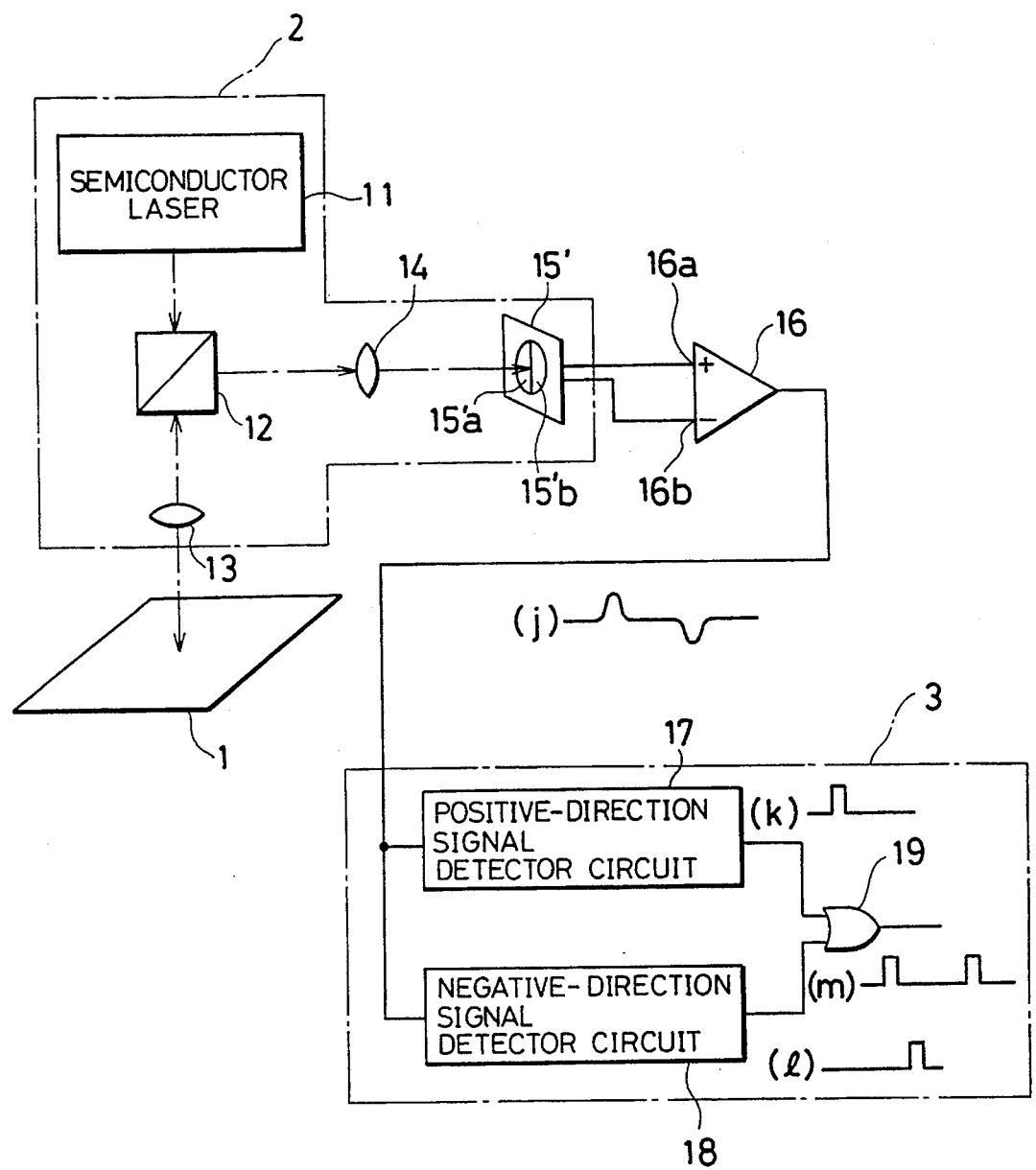
Figure 12:
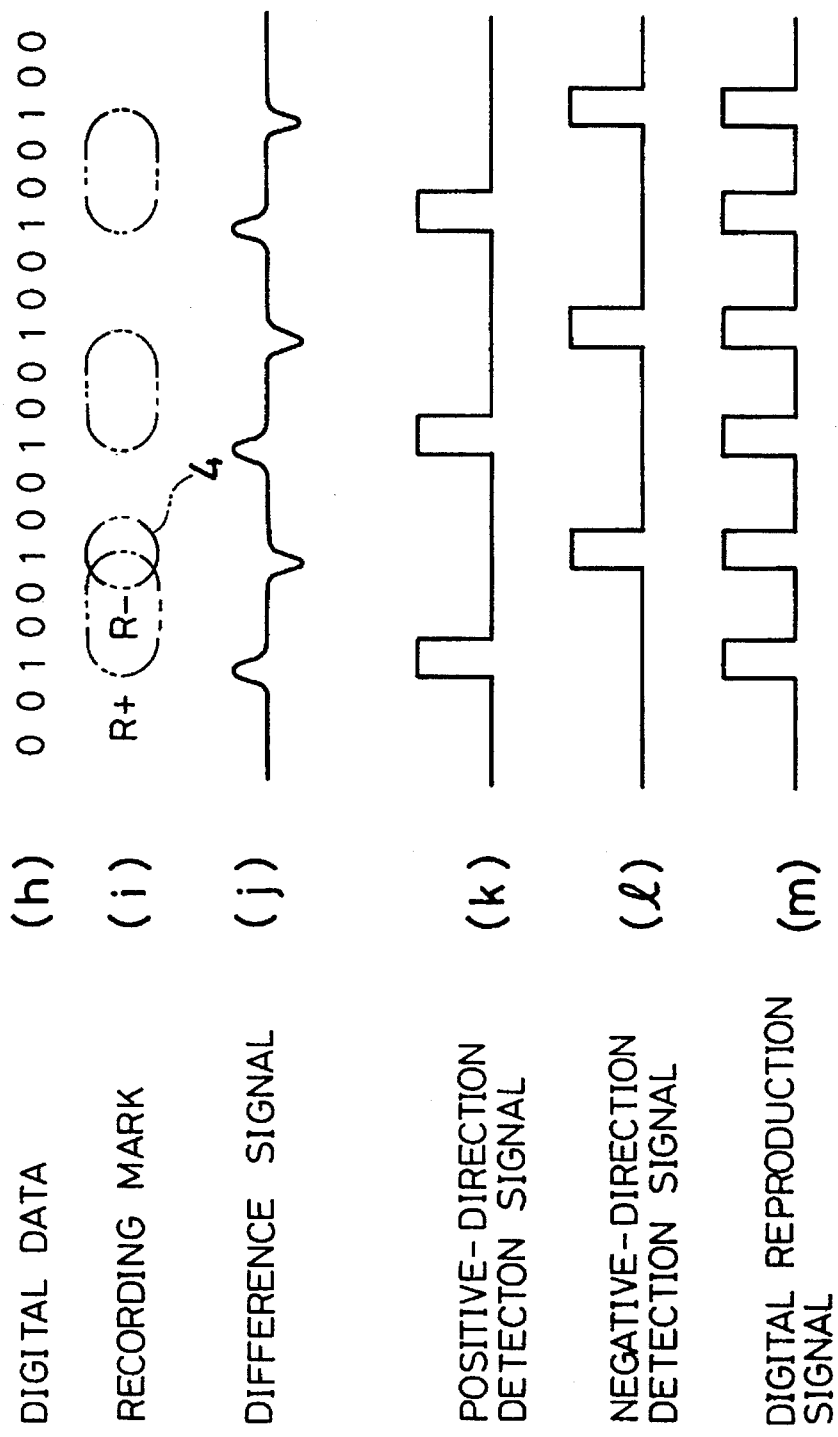
Figure 13:
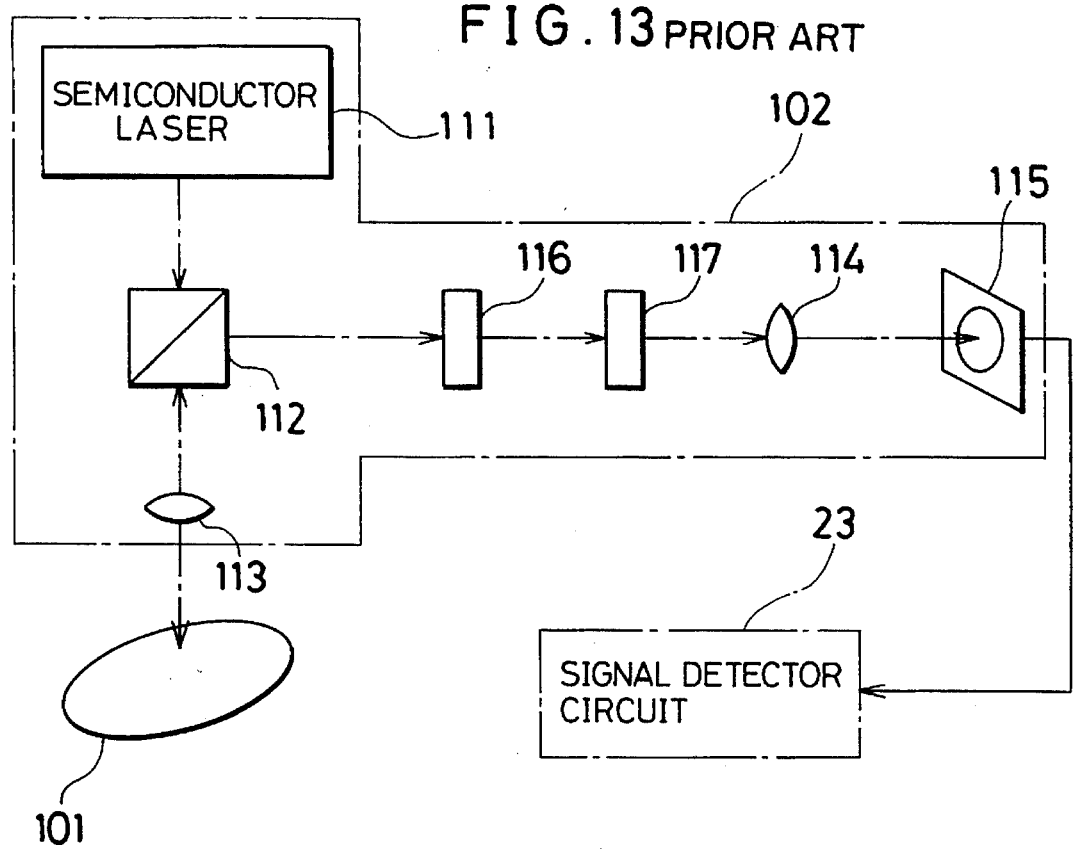
Figure 14:
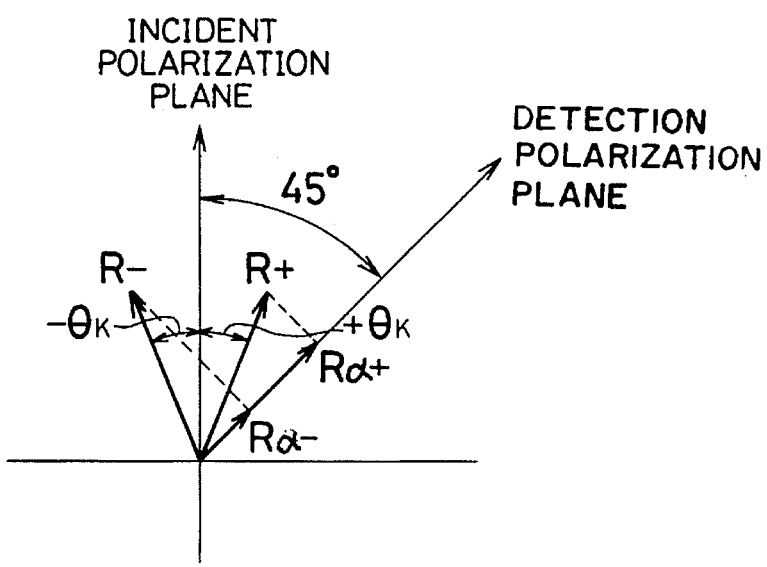

With reference to FIGS. 11 and 12, the following description will discuss an example using a two-division photo detector, instead of the photo detector 15 in the optical head 2 above-mentioned. It is noted that like parts in FIGS. 11 and 12 are designated by like numerals used in the embodiment above-mentioned.

FIG. 11 shows an example of the magneto-optical memory apparatus using a two-division photo detector.

In FIG. 11, a differential amplifier 16 is adapted to supply a difference signal containing an information pulse corresponding to "1" as the second code, based on a difference between output signals from light receiving portions 15'a, 15'b of a two-division photo detector 15'. The differential amplifier 16 has a non-inversion input terminal 16a connected to the light receiving portion 15'a of the two-division photo detector 15' in the optical head 2, and an inversion input terminal 16b connected to the light receiving portion 15'b.

A signal detector circuit 3 includes: a positive-direction signal detector circuit 17 for detecting a positive-direction signal in the difference signal supplied from the differential amplifier 16; a negative-direction signal detector circuit 18 for detecting a negative-direction signal in the difference signal; and an OR-gate 19 for supplying a digital reproduction signal upon reception of the output signals from the positive-direction signal detector circuit 17 and the negative-direction signal detector circuit 18. The positive-direction signal detector circuit 17 is adapted to detect, as 1 of digital data, the positive-direction information pulse in the difference signal supplied from the differential amplifier 16, while the negative-direction signal detector circuit 18 is adapted to detect, as 1, the negative-direction information pulse.

The positive-direction signal detector circuit 17 and the negative-direction signal detector circuit 18 may be formed by, for example, a peak position detector circuit or an amplitude detector circuit. An output from either the positive-direction signal detector circuit 17 or the negative-direction signal detector circuit 18 may be regarded as a digital reproduction signal, from which digital data may be obtained.

In the arrangement above-mentioned, at the time of recording using the magneto-optical memory apparatus, a laser light is projected from a semiconductor laser 11 of an optical head 2 and converted into a linear polarization light by a polarization beam splitter 12. The laser light is then incident on an objective lens 13, which condenses the light onto a magneto-optical disk 1. The part of the magneto-optical disk 1 irradiated by the laser light is inverted in magnetization, and recording marks shown by (i) in FIG. 12 are recorded for digital data shown by (h) in FIG. 12. Recording is made such that each edge of the recording marks corresponds to "1" sandwiched in between two "0" in the digital data (h).

At the time of reproduction, the laser light projected from the semiconductor laser 11 is condensed, by the objective lens 13, to a condensing spot 4 having a diameter equal to or smaller than the width of each recording mark. The light thus condensed is then projected to the magneto-optical disk 1. The reflected light from the magneto-optical disk 1 is incident on the polarization beam splitter 12 through the objective lens 13, and taken out as a detection polarization plane component corresponding to the magnetization direction of the magneto-optical disk 1. The light thus taken out is condensed onto the light receiving portions 15'a, 15'b of the two-division photo detector 15' by the condensing lens 14. The light thus condensed is converted into an electric signal. The outputs from the light receiving portions 15'a, 15'b are entered into the differential amplifier 16. The differential amplifier 16 supplies a difference signal (j) as a reproduction signal.

When the laser light from the optical head 2 is projected to a non-marking part of the magneto-optical disk 1, the polarization plane of the reflected light is rotated according to the magnetization direction of the non-marking part by the Kerr effect. At this time, if the polarization plane is rotated by $+\theta_K$ as shown in FIG. 3, the vector of the reflected light is R+. Since the detection polarization plane of the polarization beam splitter 12 is disposed at a right angle to the laser light incident polarization plane, the detection polarization plane component $R\alpha+$ of the reflected light R+ is obtained by detection at the polarization beam splitter 12. The light of the detection polarization plane component $R\alpha+$ is incident on the two-division photo detector 15'. At this time, since no light interference occurs, the intensity distributions or light receiving patterns of the light incident on the light receiving portions 15'a and 15'b of the two-division photo detector 15', are symmetric with each other. Accordingly, the output signals of the light receiving portions 15'a, 15'b are equal to each other, and the difference signal (j) supplied from the differential amplifier 16 is in a reference level.

When the magneto-optical disk 1 is moved and the laser light condensing spot 4 is moved from the nonmarking part to one edge of a recording mark such that this edge is irradiated by the laser light, the polarization planes of the reflected lights are respectively rotated by $-\theta_K$ and $+\theta_K$, since the recording mark is inverted in magnetization with respect to the non-marking part. Thus, the detection polarization plane components of both reflected lights are shifted by 180° in phase. This causes the reflected lights from the recording mark and the non-marking part to interfere with each other. Accordingly, the light receiving patterns in the light receiving portions 15'a, 15'b are asymmetric with each other. At this time, if the amount of the light incident on the light receiving portion 15'a is greater, the output from the light receiving portion 15'a is greater than the output of the light receiving portion 15'b, and a positive-direction information pulse is generated in the difference signal (j).

When the part between both edges of a recording mark is irradiated by the laser light, the polarization plane of the reflected light is rotated by $-\theta_K$ and the vector of the reflected light is R–. Then, the detection polarization plane component $R\alpha-$ of the reflected light R– is obtained by detection at the polarization beam splitter 12 and is incident on the two-division photo detector 15'. At this time, since light interference hardly occurs, the light receiving patterns in the light receiving portions 15'a, 15'b are symmetric with each other and the difference signal (j) is in the reference level, as in the case mentioned earlier. In such a case too, there are instances where the reflected lights from the recording mark and the non-marking part somewhat interfere with each other, resulting in a slight variation of the level of the difference signal (j).

When the magneto-optical disk 1 is moved and the laser light condensing spot 4 is moved to the other edge of the recording mark such that this edge is irradiated by the laser light, the polarization planes of the reflected lights from the recording mark and the non-marking part are respectively rotated by $-\theta_K$ and $+\theta_K$. Accordingly, both reflected lights interfere with each other, and the amount of the light incident on the light receiving portion 15'b is greater, unlike the case mentioned earlier. Thus, a negative direction information pulse is generated in the difference signal (j).

Then, the difference signal (j) is entered into the positive-direction signal detector circuit 17 and negative-direction signal detector circuit 18. The positive-direction signal detector circuit 17 supplies a positive-direction detection signal (k) of which rise portions are identical with the positive-direction peak positions of the information pulses of the difference signal (j). The negative-direction signal detector circuit 18 supplies a negative-direction detection signal (l) of which rise portions are identical with the negative-direction peak positions of the information pulses of the difference signal (j). Both detection signals (k) are entered into an OR-gate 19, which, in turn, generates a digital reproduction signal (m) obtained by logical sum of these detection signals (k). Each pulse of the digital reproduction signal (m) corresponds to "1" in the digital data (h). Accordingly, digital data as reproduction information may be obtained from the signal (m).

The description has been made of the arrangement in which reproduction is made by detecting the peak positions of the information pulses of the difference signal (j). However, the arrangement may be made such that reproduction is made by detecting, for example, the amplitude of each information pulse.

In the magneto-optical memory apparatus described and illustrated in the foregoing, the polarization beam splitter 12 is arranged such that the detection polarization plane is at a right angle to the laser light incident polarization plane.

However, it is not necessarily required that these polarization planes be at a right angle to each other. When these planes are not at a right angle to each other, it is merely required to dispose an optical system for producing a difference in phase between the reflected lights from the recording mark and the non-marking part.

Further, the description has been made of the arrangement in which reproduction is made by utilizing the fact that the polarization plane of the reflected light from the magneto-optical disk 1 is rotated by the Kerr effect. However, provision may be made such that reproduction is made by utilizing the fact that the polarization plane of the transmission light of the magneto-optical disk 1 is rotated by the Faraday effect, Further, the description has been made of the arrangement in which the division direction of the two-division photo detector 15' is identical with the scanning track direction of the magneto-optical disk 1. However, if the asymmetry of the intensity distributions of the light incident on the two-division photo detector 15' is detected, it is sufficient. Accordingly, the present invention may not be limited to the arrangement in which the division direction is identical with the scanning track direction.

The description has been made of the arrangement in which the condensing spot 4 has a diameter not greater than each recording mark. However, the diameter of the condensing spot 4 may be greater than each recording mark, as far as the light receiving patterns at the edges are asymmetric.

Further, the application of the present invention is not limited to the magneto-optical memory apparatus. The present invention may also be applied to a photomemory apparatus in which physical concavo-convex recording marks for producing light interference are formed on, for example, a recording medium. In this case, a ¼ wave plate may be disposed between the polarization beam splitter 12 and the objective lens 13, thereby to obtain the difference signal (j) in the same manner as above-mentioned. That is, there may be disposed an optical system suitable for the recording medium such that, at the edges of a recording mark, the intensity distributions of the light incident on the two-division photo detector 15' are asymmetric.

The following description will discuss an optical memory apparatus containing, as a recording media, recording marks in the form of physical concavo-convex portions adapted to produce an optical interference. For convenience, like parts in the optical memory apparatus are designated by like numerals used in the description of the magneto-optical memory apparatus above-mentioned. The description of such like parts is omitted.

The optical memory apparatus in accordance with the present invention comprises an optical disk (not shown) as an optical information recording medium, an optical head 2 and a signal detector circuit 3.

The optical disk has concavo-convex recording marks as shown in FIG. 10(i). Each edge of the recording marks A corresponds to "1" sandwiched between two "0" and each edge of the recording marks B corresponds to "11" sandwiched in between two "0". Each edge of the recording marks A is formed in an arcuate shape of which curvature is different from that of the arcuate shape of each edge of the recording marks B. That is, the arcuate edge of each of the recording marks B is longer than the arcuate edge of each of the recording marks A such that each edge of the recording marks B corresponds to two "1". The intermediate part between both edges of each of the recording marks A and B corresponds to "0", and each non-marking part also corresponds to "0".

The recording marks A and B are arranged such that, when a light beam from the optical head 2 is projected to an edge of the recording marks A and B, the reflected lights are diffracted to reduce the amount of the light incident on the optical head 2, thereby to generate an information pulse in a reproduction signal supplied from the optical head 2. For example, each of the recording marks A and B may be in the form of a pit concaved in the light beam incident direction. In this case, when a light beam is projected to an edge of a recording mark A or B, the reflected lights from the recording mark A or B and from the non-marking part are diffracted. This decreases the amount of the light incident on the optical head 2, thereby generating a negative-direction information pulse in the output from the optical head 2. The diameter of the condensing spot 4 of a laser light projected from the optical head 2 may be substantially equal to the width of each of the recording marks A and B, but may be preferably smaller than such width for assuring the generation of such information pulse.

In the arrangement above-mentioned, when a laser light projected from the optical head 2 is incident on a non-marking part of the optical disk (not shown), this incident light is reflected substantially as it is, and is incident on the optical head 2. Accordingly, a reproduction signal (j) in FIG. 10 supplied from the optical head 2 is in a high level.

When the laser light from the optical head 2 is projected to an edge of a recording mark A in the optical disk, the reflected light from the recording mark A interferes with the reflected light from the non-marking part, provoking light diffraction. Accordingly, the amount of the reflected light incident on the optical head 2 is reduced, and a negative information pulse is generated in the reproduction signal (j). This is because the diffraction effect at the edge is greater than that at other parts.

When the laser light from the optical head 2 is projected to the part between both edges of a recording mark A, the interference of the reflected lights is small such that the level of the reproduction signal (j) is slightly lowered.

Then, the reproduction signal (j) is entered into the signal detector circuit 3. When the signal detector circuit 3 is provided with a peak position detector circuit, there is obtained a digital reproduction signal (k) of which rise portions are identical with the negative peak positions of the information pulses in the reproduction signal (j). On the other hand, the signal detector circuit 3 has an amplitude detector circuit, there is obtained a digital reproduction signal (l) which is in a high level for a predetermined width to the negative peak positions of the information pulses. The pulses of the digital reproduction signal (k) or (l) correspond to "1" of the digital data (h). Thus, digital data (m) as reproduction information may be obtained from the signal (k) or (l).

On the other hand, when the laser light from the optical head 2 is projected to an edge of a recording mark B of the optical disk, the width of an information pulse generated in the reproduction signal (j) is increased, since the edge arcuate portion of the recording mark B is longer than the edge arcuate portion of the recording mark A. Accordingly, when the reproduction signal (j) is entered into the signal detector circuit 3 having the amplitude detector circuit, the digital reproduction signal (l) obtained from the signal detector circuit 3 is in a high level to the negative peak positions of the information pulses of the reproduction signal (j), and has pulses of which widths are corresponding to the widths of the information pulses of the reproduction signal (j). More specifically, each pulse of the digital reproduction signal (l) has a width corresponding to "11" of the digital data (h). Accordingly, there are obtained digital data (m), as reproduction information, from the digital reproduction signal (l).

It is noted that even though the scanning speed of the laser light spot is changed with the curvature of the edge of the recording mark maintained constant, it is possible to likewise change the pulse length of the reproduction signal (j), in the example above-mentioned. For example, when recording is made in CLV (constant linear velocity) at the time of previously recording prepits in the optical disk and reproduction is made in CAV (constant angular velocity), it is possible to change the pulse length of the reproduction signal (j) at the edges of the recording mark for the inner and outer peripheries of the optical disk. More specifically, when recording is made in CLV, the edges of the recording mark present the same curvature for the inner and outer peripheries of the optical disk. When reproduction is made in CAV, the recording marks at the outer periphery are read as having a smaller curvature, since the running speed of the disk is higher at the outer periphery thereof. Accordingly, the width of the reproduction signal detected at the edge is greater for the inner part. If such width is regarded as one information, such information may be recognized as a track position information (ID information). That is, in the method above-mentioned, the curvature of the edge of a recording mark is understood in an analogue manner.

Figure 7:
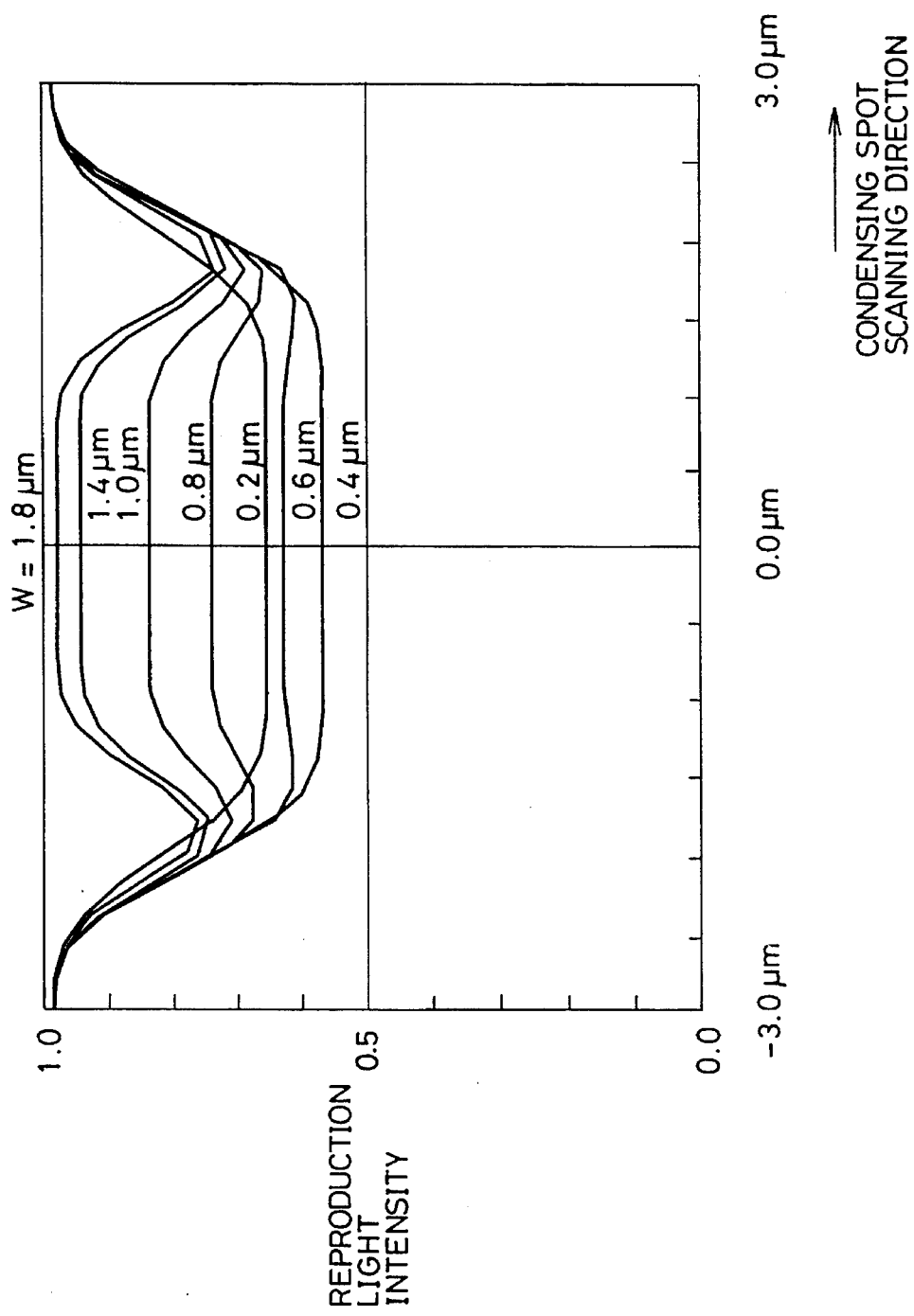

FIGS. 5(b) and 7 show the results of calculator simulations of the reproduction signal.

FIG. 5(b) shows the relationship between a recording mark C and the light condensing spot 4 in a calculator simulation of reproduction signals in FIGS. 6 and 7. In FIGS. 5(b) and 7, the recording mark C is made in the form of an ellipse having a length of 4 µm and a width of W, and has at each edge thereof a semi-circular portion having a radius of W/2. The light condensing spot 4 is a Gaussian beam with a radius is 0.65 µm (This is a radius of a circle of which beam intensity is equal to 1/e$^2$). The light condensing spot 4 scans in the direction of the line of apsides of the recording mark C. The distance in center between the recording mark C and the light condensing spot 4 is shown at the upper portion in FIG. 5(b). The substrate of the optical disk (not shown) having the recording mark C formed thereon, has a refractive index of 1.5. The pitch between adjacent tracks in the longitudinal direction on the drawing paper is equal to 1.6 µm. The objective lens has an aperture ratio of 0.55, and the laser light forming the condensing spot 4 has a wavelength of 0.78 µm.

FIG. 6 shows the results of a simulation in which the recording mark C has a depth or height D of 0.13 µm. The axis of abscissa represents the scanning direction of the light condensing spot 4 and shows the distance between the center of the recording mark C and the center of the light condensing spot 4. The axis of ordinate represents the intensity of a reproduction light incident on the photo detector. This intensity is set to 1.0 when the light condensing spot 4 is located perfectly in positions other than the recording mark C, and set to 0.0 when no reproduction light is generated. The photo detector 15 generates a reproduction signal corresponding to such a reproduction light. A simulation was made of the reproduction waveform for seven different widths W (twice the radius of the edge arcuate portion) of the recording mark C, i.e., 0.2 µm, 0.4 µm, 0.6 µm, 0.8 µm, 1.0 µm, 1.4 µm and 1.8 µm. There are obtained remarkable pulses at the edges of the recording mark C for W=1.4 µm and 1.8 µm.

As to the width W of the recording mark C (twice the radius of the edge arcuate portion thereof), the information pulses are remarkable for W=1.8 µm and 1.4 µm. Even for W=1.0 µm and 0.8 µm, the pulses are still present at the edges and the center portion of the recording mark C is gradually lowered in level.

FIG. 7 shows the results of a simulation in which the recording mark C has a depth or height D of 0.065 µm. FIG. 7 shows signals having widths generally smaller than those shown in FIG. 6, but generally presents a trend similar to that in FIG. 6.

According to the results of the simulation, the information pulse may be increased for the recording mark C having a depth or height D of about 0.13 µm. This is a value obtained according to the following equation for maximizing the effect of light interference:

$$n \times d \times 2 = \lambda/2$$

where n: Refractive index of the substrate d: Depth or height of the recording mark C k: Wavelength of the laser light This shows that, when the recording mark C has a depth or height D of 0.13 µm, the information pulses corresponding to the edges of the recording mark C are produced with great clarity.

As to the width W of the recording mark C (twice the radius of the edge arcuate portion thereof), the information pulses are remarkable for W=1.8 µm and 1.4 µm. Even for W=1.0 µm and 0.8 µm, the pulses are still present at the edges and the center portion of the recording mark C is gradually lowered in level.

The simulations were made under the conditions above-mentioned. It is apparent that the optimum width, depth or height of the recording mark C varies with changes in, for, example, the refractive index of a glass substrate, the wavelength λ of the laser light, the aperture ratio of the objective lens and the like.

The following description will discuss how to record data with the width W of the recording mark C altered.

For example, the intensity of an externally applied magnetic field is weakened with the diameter of the light condensing spot 4 maintained constant. This enables data to be recorded with the width of the recording mark C reduced. On the contrary, if the externally applied magnetic field is increased, the width of the recording mark C is increased.

Instead of alteration of the intensity of the magnetic field, the light intensity of the light condensing spot 4 used at the recording time may vary. That is, as the light intensity is lowered, the width of the recording mark C is reduced, and vice versa.

Alternately, the same effect may be achieved by electrically the focus in a focus servo system for condensing the light condensing spot 4 on the optical disk. That is, the addition of offset to the focus enables the light condensing spot 4 to be widened.

Another example of the concavo-convex recording marks are shown in FIG. 4(b).

The recording marks in FIG. 4(b) are arranged such that, only when a laser light as a light beam from the optical head 2 is projected onto a recording mark edge, the reflected lights are diffracted to decrease the amount of the light incident on the optical head, thereby to generate an information pulse in a reproduction signal supplied from the optical head 2.

When the laser light projected from the optical head is incident on other non-marking part than the recording marks A and B in the optical disk, this light is reflected substantially as is, incident on the optical head 2. Accordingly, a reproduction signal (j) supplied from the optical head 2 is in a high level as shown in FIG. 4(b). When the laser light from the optical head 2 is projected to an edge of a recording mark A, the reflected lights from the recording mark A and the non-marking part interfere with each other, provoking light diffraction. This decreases the amount of the light incident on the optical head 2 to generate a negative-direction information pulse in the reproduction signal (j). This is because the diffraction efficiency at the edge above-mentioned is greater than that at other parts. Further, when the laser light is projected to the intermediate part of both edges of a recording mark A, the reflected lights are hardly diffracted so that the reproduction signal (j) is in a high level.

When the laser light from the optical head 2 is projected to an edge of a recording mark B in the optical disk, a negative-direction information pulse is generated in the reproduction signal (j) likewise in the recording mark A above-mentioned. When the laser light is projected to the intermediate part of both edges of a recording mark B, the reflected lights are diffracted since the laser light condensing spot 4 has a diameter greater than the width of the recording mark B. Accordingly, the reproduction signal (j) is in a level lower than that of the reference value. Digital data (m) are obtained from the reproduction signal (j) through digital reproduction signals (k) (l).

In the foregoing, the descriptions have been respectively made of the magneto-optical memory apparatus and the optical memory apparatus. It is however noted that the present invention may also be applied to a magneto-optical memory apparatus in which the magneto-optical recording medium previously contains physical concavo-convex portions presenting the track address information.

As thus described, the magneto-optical memory apparatus in accordance with the present invention comprises:

an optical head;

a magneto-optical recording medium relatively movable with respect to the optical head, into which recording marks, each having two ends, are recorded as information;

the optical head being arranged such that,
  (i) at the time of recording into the magneto-optical recording medium, the recording marks are recorded such that the ends of each recording mark correspond to a second code of digital information composed of two different types of codes,
  (ii) at the time of reproduction, a light beam having a condensing spot is projected to the magneto-optical recording medium and a reproduction signal is supplied when a reproduction light containing reproduction information is entered from the magneto-optical recording medium, and
  (iii) when the light beam is projected to a recording mark, an information pulse corresponding to the second code is generated in the reproduction signal, only when the reproduction light from the recording mark interferes with the reproduction light from the non-marking part; and a signal detector circuit for detecting the information pulse of the reproduction signal obtained from the optical head and for converting the reproduction signal into a digital reproduction signal.

According to the arrangement above-mentioned, each recording mark may contain a number of information to enhance the recording density in the magneto-optical recording medium, enabling to increase the recording capacity thereof.

Thus, the recording density is not enhanced by merely making the recording marks in a compact design. Accordingly, the recording marks may be readily made in a large size and in a suitable shape.

Further, according to the present invention, the number of component elements of the optical system may be reduced. This simplifies the optical system in arrangement.

The signal detector circuit may include a peak position detector circuit for detecting the peak positions of information pulses of the reproduction signal and/or an amplitude detector circuit for detecting the width and interval of information pulses of which level is not greater than a reference value.

The magneto-optical memory apparatus according to the present invention may comprise:

an optical head;

a magneto-optical recording medium relatively movable with respect to the optical head, into which first and second recording marks are recorded as information;

the optical head being arranged such that,
  (i) at the time of recording to the magneto-optical recording medium, the first and second recording marks are recorded such that the ends thereof in the relative moving direction with respect to the optical head, correspond to a second code of digital information composed of two different types of codes,
  (ii) each of the second recording marks is recorded in a width smaller than that of each of the first recording marks such that the part between both ends of each second recording mark corresponds to the second code above-mentioned,
  (iii) at the time of reproduction, a light beam having a condensing spot having a diameter smaller than the width of each first recording mark and greater than the width of each second recording mark, is projected to the magneto-optical recording medium,
  (iv) upon reception of a reproduction light containing reproduction information from the magneto-optical recording medium, a reproduction signal is supplied, and only at the time of reception of the reproduction lights generated by irradiation of a light beam to an end of a first or second recording mark, an information pulse corresponding to the second code above-mentioned is generated due to interference of the reproduction lights from the first or second recording mark and the non-marking part, and
  (v) when the light beam is projected to the part between both ends of a second recording mark, there is supplied a reproduction signal having a level lower than a reference value due to interference of the reproduction light from the second recording mark with the reproduction light from the non-marking part; and a signal detector circuit for detecting, as the second code, the information pulses of the reproduction signal obtained from the optical head and the parts of information pulses having a level not greater than the reference value, and for converting the reproduction signal into a digital reproduction signal.

The magneto-optical recording medium may be made of plastic or glass and formed in the shape of a disk or a card, and provided with a magnetic thin film having a magnetization facilitating axis in a direction at a right angle to the surface thereof. The recording marks as information may be recorded and erased by inversion of the magnetization direction.

To reduce the number of component elements in the optical system, the optical head may include a polarization beam splitter and may be arranged such that the detection polarization plane is at a right angle to the incident polarization plane.

To facilitate the generation of the information pulses, the magneto-optical recording medium may be arranged such that each of the first recording marks is made in the form of an ellipse of which length and width are greater than the diameter of the condensing spot of a laser light used at the time of reproduction, and each of the second recording marks has a length greater than the diameter of the condensing spot.

The signal detector circuit may include a peak position detector circuit for detecting the peak positions of information pulses of the reproduction signal and an amplitude detector circuit for detecting the width and interval of information pulses having a level not greater than a reference value.

The magneto-optical memory apparatus in accordance with the present invention may comprise:

an optical head; and a magneto-optical recording medium relatively movable with respect to the optical head, into which recording marks as information are recorded;

the optical head having
(i) an optical system unit for supplying interference lights, in opposite phases, respectively obtained from a reproduction light from a recording mark as irradiated by a light beam, and a reproduction light from the non-marking part, and
(ii) a photo detector for converting the reproduction lights into electric signals each having a level corresponding to the amount of the incident light;

the optical head being arranged such that,
(i) at the time of recording into the magneto-optical recording medium, there are recorded recording marks corresponding to the second code of digital information composed of two different types of codes,
(ii) at the time of reproduction, a light beam having a condensing spot having a diameter greater than the width of each recording mark, is projected to the magneto-optical recording medium, from which supplied are reproduction lights containing reproduction information, and
(iii) the interference lights obtained from these reproduction lights are supplied to the photo detector, from which a reproduction signal is supplied.

The optical system may be so arranged as to detect a decrease in amount of received light due to interference of the reproduction light from a recording mark as irradiated by a light beam, with the reproduction light from the non-marking part.

To reduce the number of component elements of the optical system unit, the optical system may include a polarization beam splitter and may be arranged such that the detection polarization plane is at a right angle to the incident polarization plane.

The optical head may be arranged such that, at the time of reproduction, a condensing spot having a diameter greater than the width of a recording mark of the magneto-optical recording medium, is projected to the magneto-optical recording medium, and the reflected light as a reproduction light is obtained.

The magneto-optical memory apparatus in accordance with the present invention may comprise:

an optical head;

a magneto-optical recording medium relatively movable with respect to the optical head, into which recording marks as information are recorded;

the optical head being arranged such that,
(i) at the time of recording into the magneto-optical recording medium, recording marks are recorded such that the ends thereof in the relative moving direction with respect to the optical head, correspond to the second code sandwiched in between two first codes of digital information composed of two different types of codes, and
(ii) at the time of reproduction, a light beam having a condensing spot having a diameter not greater than the width of each recording mark, is projected to the magneto-optical recording medium, and a reproduction signal is supplied upon reception of a reproduction light containing reproduction information from the magneto-optical recording medium, and an information pulse corresponding to the second code above-mentioned is generated in the reproduction signal due to interference of the reproduction light from a recording mark, with the reproduction light from the non-marking part, upon reception of the reproduction light generated when an end of a recording mark is irradiated by the light beam; and a signal detector circuit for detecting, as the second code, the information pulse in the reproduction signal obtained from the optical head and for converting the reproduction signal into a digital reproduction signal.

The magneto-optical recording medium may have first and second recording marks, of which ends in the relative moving direction with respect to the optical head, correspond to the second code of digital information composed of two different types of codes, and which are formed in arcuate shapes having different curvatures. Each arcuate end of a second recording mark may be longer than that of a first recording mark such that each arcuate end of the second recording mark corresponds to two second codes.

To facilitate the generation of information pulses, the magneto-optical recording medium may be arranged such that each recording mark is made in the form of an ellipse of which length and width are greater than the diameter of the condensing spot used at the time of reproduction.

The optical head may be arranged such that, when a light beam is projected to an end of a recording mark, the detection polarization plane components of the reflected lights from the recording mark and the non-marking part are shifted by 180° in phase.

The magneto-optical memory apparatus in accordance with the present invention may comprise:

an optical head having a two-division photo detector;

a magneto-optical recording medium relatively movable with respect to the optical head, into which recording marks as information are recorded, the magneto-optical recording medium being arranged such that
(i) each end of the recording marks in the relative moving direction with respectot the optical head, corresponds to the second code sandwiched in between two first codes of digital information composed of two different types of codes, and
(ii) when a light beam from the optical head is projected to an end of a recording mark, the intensity distributions of the reproduction light in light receiving portions of the two-division photo detector of the optical head are asymmetric with each other due to light interference;

the optical head being adapted to project a light beam to the magneto-optical recording medium, from which a reproduction light containing reproduction information is entered, the optical head being arranged such that, upon reception of a reproduction light generated at the time a light beam is projected to an end of a recording mark, the intensity distributions in two independent light receiving portions of the two-division photo detector are asymmetric with each other due to the reproduction lights from the recording mark and the non-marking part;

a differential amplifier for supplying a difference signal containing an information pulse corresponding to the second code, based on a difference between electric signals supplied from both light receiving portions of the two-division photo detector; and a signal detector circuit for detecting, as the second code, the information pulse of the difference signal supplied from the differential amplifier and for generating a digital reproduction signal from the difference signal.

To facilitate the generation of the information pulse, the magneto-optical recording medium may be arranged such that each of the recording marks is made in the form of an ellipse of which length and width are greater than the diameter of a condensing spot used at the time of reproduction.

The two-division photo detector may have two divided light receiving portions such that the division direction is identical with the direction of the scanning tracks on the magneto-optical recording medium.

The signal detector circuit may include a positive direction detector circuit for detecting a positive-direction information pulse in the information pulse of the difference signal supplied from the differential amplifier, a negative-direction detector circuit for detecting a negative-direction information pulse, and an OR-gate for calculating a logical sum of these detector circuits.

The positive direction detector circuit and the negative direction detector circuit may include a peak position detector circuit and/or an amplitude detector circuit.

The optical head may be arranged such that, when a light beam is projected to an end of a recording mark and the reproduction light is incident on the two-division photo detector, the intensity distributions of such incident light are asymmetric with each other.

The optical head may be arranged such that, at the time of reproduction, the reproduction lights or reflected lights from a recording mark and a non-marking part are shifted in phase.

As described in the foregoing, the optical memory apparatus in accordance with the present invention is characterized in that:

the recording marks as information are recorded, in the form of physical concavo-convex portions, in the optical information recording medium;

the recording marks are arranged such that the ends thereof in the relative moving direction with respect to the optical head, correspond to a second code sandwiched in between two first codes of digital information composed of two different types of codes; and when a light beam from the optical head is projected to an end of a recording mark, the reflected lights are diffracted due to the concavo-convex portions to decrease the amount of the light incident on the optical head, thereby to generate an information pulse in a reproduction signal supplied from the optical head.

Another example of the optical memory apparatus in accordance with the present invention is characterized in that:

first and second recording marks as information are recorded, in the form of physical concavo-convex portions, in an optical information recording medium;

the ends of the first and second recording marks in the relative moving direction with respect to an optical head, correspond to a second code of digital information composed of two different types of first and second codes;

only when a light beam projected from the optical head is projected to an end of the recording marks, the reflected lights are diffracted due to the concavo-convex portions to decrease the amount of the light incident on the optical head, thereby to generate an information pulse in a reproduction signal supplied from the optical head;

the intermediate part of both ends of each of the second recording marks corresponds to the second code above-mentioned; and each of the second recording marks has a width smaller than that of each of the first recording marks such that, when the light beam from the optical head is projected to the intermediate part of a second recording mark, the reflected lights are diffracted due to the concavo-convex portions to decrease the amount of the light incident on the optical head so that a reproduction signal supplied from the optical head is lower in level than the reference value.

According to the arrangement above-mentioned, each recording mark contains a number of information to enhance the recording density in the optical information recording medium, thereby to increase the recording capacity.

Thus, the recording density is not enhanced by merely making the recording marks in a compact design. Accordingly, the recording marks may be made in a large size and in a suitable shape. This facilitates the transfer of the recording marks made by plastic forming or the like.

What is claimed is:

1. A magneto-optical memory apparatus for recording to and reproducing from a magneto-optical recording medium a digital information signal the that includes a sequence of first and second codes, the apparatus comprising:

an optical head being arranged for recording the digital information signal by forming in the recording medium elongated recording marks which are mutually separated by non-marked portions in a track direction, the recording marks having a different magnetization direction to the magnetization direction of surrounding non-marked portions of the recording medium, the ends of each recording mark in the track direction representing respective second codes of the digital information signal, the non-marked portions representing respective the first codes of the digital information, and for reproducing the recorded information signal by scanning of a spot of a beam of light having a predetermined polarization plane over the recording medium in the track direction, and detecting the beam of light transmitted through or reflected by the recording medium; and detection means for detecting, from said detected transmitted or reflected beam of light, the second codes represented by ends of each recording mark and interaction of respective polarization components of light ($R\alpha+$, $R\alpha-$) arising from a part of said spot of a beam of light which impinges on a non-marked portion of the recording medium adjacent an end of the recording mark and a part of said spot of a beam of light which impinges on an end portion of the recording mark, said light components having opposing directions.

2. A magneto-optical memory apparatus according to claim 1, wherein said light components (Rα+, Rα−) exist in a polarization plane which is orthogonal to the predetermined polarization plane of an incident light beam.

3. A magneto-optical memory apparatus according to claim 2, said optical head including a polarization beam splitter for directing the reproduction light beam to the recording medium and for directing the reflected light beam towards a photodetector included in said optical head which detects therefrom the light components in said orthogonal polarization plane.

4. A magneto-optical memory apparatus according to claim 3, wherein the photodetector receives the detected transmitted or reflected light beam and produces an output reproduction signal having information pulses whose peaks correspond with the second codes represented by the ends of the recording marks.

5. A magneto-optical memory apparatus according to claim 4, said detecting means including a peak position detector circuit for detecting said peaks of the reproduction signal pulses.

6. A magneto-optical memory apparatus according to claim 5, said detecting means including an amplitude detector circuit for detecting the width and interval of said information pulses having a level not more than said predetermined amount below said peaks.

7. A magneto-optical memory apparatus according to claim 1, wherein the recording marks have a length which represent two of said first codes of the digital information signal sandwiched between the two second codes represented by the ends of the recording mark.

8. A magneto-optical memory apparatus according to claim 7, wherein each of said recording marks has a width in an intermediate portion between the two ends which is larger than the diameter of the spot of the reproduction light beam, whereby the intermediate portion of the recording mark represents two first codes of the information signal.

9. A magneto-optical memory apparatus according to claim 7, wherein said optical head is arranged to form said recording marks in a first type having a width in the intermediate portion between the two ends which is larger than the diameter of the spot of the reproduction light beam, whereby the intermediate portion of the first type recording mark represents two first codes of the information signal, or in a second type having a width in the intermediate portion between the two ends which is smaller than the width of the intermediate portion of the first type recording mark and smaller than the diameter of the reproduction light beam spot, whereby the intermediate portion of the second type recording mark represents two second codes of the information signal which are detected using said detection means.

10. A magneto-optical memory apparatus according to claim 9, wherein the difference between the diameter of the spot of the reproduction light beam and the width of the intermediate portion of the second type recording mark is set such that said output reproduction signal has a level below peak levels by not more than a predetermined amount when the spot of the reproduction light beam illuminates the intermediate portion of the second type recording mark.

11. A magneto-optical memory apparatus according to claim 1, wherein each of the recording marks is recorded such that each second code of the digital information signal represented by an end of the recording mark is sandwiched in between two first codes of the information signal, wherein said optical head includes a two-division photodetector having two independent light-receiving portions arranged to receive respective portions of said detected transmitted or reflected light beam, and, means for detecting the second codes represented by the ends of each recording mark by virtue of asymmetric intensity distribution between said parts of the detected transmitted or reflected light beam caused by different degrees of said interaction for those parts when the reproduction beam spot illuminates an end of a recording mark, said means for detecting comprising a differential amplifier whose inputs are supplied with the respective electrical outputs of said light-receiving portions of the photodetector so as to output a difference signal containing an information pulse which corresponds to the second code, and said detection means includes a signal detector circuit for detecting each said information pulse so as to generate a digital reproduction signal containing pulses which correspond to the second codes of said information signal.

12. A magneto-optical memory apparatus according to claim 11, wherein said recording marks have a length and a width which are greater than the diameter of the spot of the reproduction beam of light.

13. A magneto-optical memory apparatus according to claim 12, wherein said two light-receiving portions of the two-division photodetector are divided in the direction perpendicular to scanning tracks on the recording medium.

14. A magneto-optical memory apparatus according to claim 12, wherein the signal detector circuit includes a positive direction detector circuit for detecting a positive-direction information pulse in said difference signal, and further including a negative direction detector circuit for detecting a negative-direction information pulse in said difference signal, and an OR-gate for calculating a logical sum of the outputs of said detector circuits.

15. A magneto-optical memory apparatus according to claim 14, wherein the positive direction detector circuit and the negative direction detector circuit include a peak position detector circuit and/or an amplitude detector circuit.

16. A magneto-optical memory apparatus according to claim 1 wherein said recording medium includes a magnetic film layer which has an easy axis of magnetization which is perpendicular to the surface thereof and;

said recording marks are formed by an inverted magnetization direction.

17. A magneto-optical memory apparatus for recording to and reproducing from a magneto-optical recording medium a digital information signal that includes a sequence of first and second codes, the apparatus comprising:

an optical head for recording the information signal by forming in the recording medium recording marks which are mutually separated by non-recording portion in a track direction, said recording marks having a different magnetization direction to that of surrounding non-marked portions of the recording medium and each of the recording marks representing two or a sequence of said second codes, and for reproducing the recorded information signal by scanning the spot of a beam of light having a predetermined polarization plane over the recording medium in the track direction, and detecting the beam of light transmitted through or reflected by the recording medium, the spot of the reproduction light beam having a diameter which is greater than the width of the recording marks;

the length of the recording mark in the beam scan direction determines the number of second codes represented by the mark, and;

detection means for detecting from said detected transmitted or reflected beam of light the recording marks and interaction of respective polarization components of light (Rα+, Rα−) arising from a part of said light beam spot which impinges on a non-marked portion of the recording medium adjacent the recording mark being detected and a part of said spot of the beam of light which impinges on a portion of the recording mark, said light components having opposing directions.

18. A magneto-optical memory apparatus according to claim 17, wherein said light components light (Rα+, Rα−) exist in a polarization plane which is orthogonal to the predetermined polarization plane of the incident light beam.

19. A magneto-optical memory apparatus according to claim 18, said optical head including a polarization beam splitter for directing the reproduction light beam to the recording medium and for directing the reflected light beam towards a photodetector included in said optical head which detects therefrom the light components in said orthogonal polarization plane.

20. A magneto-optical memory apparatus according to claim 17, said photodetector receiving the detected transmitted or reflected light beam and producing an output reproduction signal whose level is reduced as the result of said interaction when the beam spot illuminates the recording mark.

21. A magneto-optical memory apparatus comprising:

a magneto-optical recording medium whereon information is recorded by forming a plurality of first recording marks and second recording marks, each of said respective first and second recording marks having two ends in a track direction, said information being recorded in the form of first and second recording marks on said magneto-optical recording medium such that each one of the recording marks having its ends coincides with one of two different binary logic conditions 0 and 1; and reproducing means for reproducing the recorded information by projecting a light beam onto said magneto-optical recording medium, said light beam having a diameter smaller than the width of each said first recording mark in a direction orthogonal to the track direction and greater than the width of each said second recording mark in a direction orthogonal to the track direction, for releasing a reproduction signal responsive to a part of a beam of light which is selected from the group consisting of reflected or transmitted light, from said recording medium, and for generating information pulses in the reproduction signal when a part of said beam of light from said first or second recording mark interferes with a part of said beam of light from a non-recorded area, said information pulses corresponding to said binary logic condition associated with said recording marks;

said reproducing means includes signal detection means for converting said reproduction signal into a digital reproduction signal according to said information pulses;

wherein a width of each second recording bit in a orthogonal to the track direction is smaller than the width of said first recording mark in a direction orthogonal to the track direction; so that a reproduction signal smaller than a reference level is released due to optical interference of a part of said beam of light from said second recording mark with a part of said beam of light from the non-recorded area.

22. A method for recording to and reproducing from a magneto-optical recording medium a digital information signal comprising the steps of:

(a) forming the digital information signal which includes first and second codes in mutually separated recording marks in a track direction by non-marked portions on said recording medium, said recording marks have different magnetization directions to surrounding non-marked portions and the ends of each recording mask representing respective second codes of the digital information;

(b) scanning by a beam of light spot having a predetermined polarization plane over the recording medium in the track direction;

(c) detecting a beam of light transmitted through or reflected by the recording medium; and (d) detecting the second codes by detecting respective polarization of respective light components (Rα+Rα−) having opposite polarities that arises from a part of the light beam spot which impinges on a non-marked portion of the recording medium adjacent the recording marks and an end portion of the recording mark.

* * * * *

UNITED STATES PATENT AND TRADEMARK OFFICE
CERTIFICATE OF CORRECTION

PATENT NO. : 5,546,364
DATED : 08/13/96
INVENTOR(S) : Hiroshi Fuji, Toshihisa Deguchi, Kunio Kojima, Takeshi Yamaguchi, Shigeo Terachima, Akira Takahashi, Kenji Ohta It is certified that error appears in the above-indentified patent and that said Letters Patent is hereby corrected as shown below:

On the cover sheet of the patent, left column, first three lines change the Title to read --MAGNETO-OPTICAL MEMORY APPARATUS UTILIZING EDGES OF RECORDING MARK TO MANAGE DATA--.

column 1, first three lines, change the Title to read --MAGNETO-OPTICAL MEMORY APPARATUS UTILIZING EDGES OF RECORDING MARK TO MANAGE DATA--...

Signed and Sealed this

Thirty-first Day of December, 1996

*Attest:*

BRUCE LEHMAN

*Attesting Officer*     Commissioner of Patents and Trademarks